(12) United States Patent
Harel

(10) Patent No.: US 11,265,739 B2
(45) Date of Patent: Mar. 1, 2022

(54) WIRELESS COMMUNICATIONS SYSTEMS SUPPORTING SELECTIVE ROUTING OF CARRIER AGGREGATION (CA) AND MULTIPLE-INPUT MULTIPLE-OUTPUT (MIMO) DATA STREAMS

(71) Applicant: Corning Optical Communications LLC, Charlotte, NC (US)

(72) Inventor: Dror Harel, Hod Hasharon (IL)

(73) Assignee: Corning Optical Communications LLC, Charlotte, NC (US)

(*) Notice: Subject to any disclaimer, the term of this patent is extended or adjusted under 35 U.S.C. 154(b) by 56 days.

(21) Appl. No.: 16/816,928

(22) Filed: Mar. 12, 2020

(65) Prior Publication Data

US 2020/0213877 A1 Jul. 2, 2020

Related U.S. Application Data

(63) Continuation of application No. 16/170,454, filed on Oct. 25, 2018, now abandoned.

(51) Int. Cl.
*H04W 24/02* (2009.01)
*H04B 7/024* (2017.01)
*H04B 7/0413* (2017.01)

(52) U.S. Cl.
CPC ........... *H04W 24/02* (2013.01); *H04B 7/024* (2013.01); *H04B 7/0413* (2013.01)

(58) Field of Classification Search
CPC ... H04W 24/02; H04W 40/02; H04W 88/085; H04W 84/06; H04B 7/024; H04B 7/0413;
(Continued)

(56) References Cited

U.S. PATENT DOCUMENTS 6,999,775 B1 2/2006 Tikka
8,923,908 B2 12/2014 Shida
(Continued)

FOREIGN PATENT DOCUMENTS

WO 2014054892 A1 4/2014
WO 2015084855 A1 6/2015
(Continued)

OTHER PUBLICATIONS

Arik, Sercan O., Joseph M. Kahn, and Keang-Po Ho. "MIMO signal processing for mode-division multiplexing: An overview of channel models and signal processing architectures." IEEE Signal Processing Magazine 31.2 (2014): 25-34. (Year: 2014).*
(Continued)

*Primary Examiner* — Sharad Rampuria
(74) *Attorney, Agent, or Firm* — C. Keith Montgomery

(57) ABSTRACT

Wireless communications systems supporting selective routing of carrier aggregation (CA) and multiple-input multiple-output (MIMO) data streams are disclosed. The wireless communications system includes a signal router circuit communicatively coupled to one or more signal sources. The signal router circuit is configured to receive MIMO and CA communications signals for data transmission from the signal source(s) and distribute the communications signals (e.g., data streams) to remote units communicatively coupled to the signal router circuit. The signal router circuit determines whether to route each data stream in a MIMO configuration, a CA configuration, or both to provide an improved wireless communications environment for mobile communications devices connected to the remote units. The improved wireless communications environment may increase throughput, reduce interference and/or noise, and/or improve the transmission quality of wireless communications signals.

23 Claims, 11 Drawing Sheets

(58) Field of Classification Search
CPC ............ H04B 7/18528; H04B 7/18571; H04B 7/18576; H04L 5/001; H04L 5/0023
See application file for complete search history.

(56) References Cited

U.S. PATENT DOCUMENTS

| | | |
|---|---|---|
| 9,585,149 B1 | 2/2017 | Park et al. |
| 2002/0006167 A1 | 1/2002 | McFarland |
| 2011/0135308 A1 | 6/2011 | Tarlazzi et al. |
| 2012/0052903 A1 | 3/2012 | Han et al. |
| 2012/0308238 A1 | 12/2012 | Shida |
| 2013/0230080 A1* | 9/2013 | Gudem ................ H04B 1/0064 375/219 |
| 2016/0302203 A1 | 10/2016 | Liu et al. |
| 2017/0111801 A1 | 4/2017 | Tomeba et al. |
| 2017/0257807 A1 | 9/2017 | Zacharias et al. |
| 2018/0176119 A1 | 6/2018 | Abdallah et al. |
| 2018/0309510 A1 | 10/2018 | Trojer et al. |
| 2019/0166603 A1 | 5/2019 | Wang |

FOREIGN PATENT DOCUMENTS

| | | |
|---|---|---|
| WO | 2017160195 A1 | 9/2017 |
| WO | 2018154001 A1 | 8/2018 |

OTHER PUBLICATIONS

Sundaresan, Karthikeyan, et al. "Medium access control in ad hoc networks with MIMO links: optimization considerations and algorithms." IEEE Transactions on Mobile Computing 3.4 (2004): 350-365. (Year: 2004).*
International Search Report and Written Opinion of the European International Searching Authority; PCT/US2019/055290; dated Jan. 24, 2020; 12 Pgs.

* cited by examiner

WIRELESS COMMUNICATIONS SYSTEMS SUPPORTING SELECTIVE ROUTING OF CARRIER AGGREGATION (CA) AND MULTIPLE-INPUT MULTIPLE-OUTPUT (MIMO) DATA STREAMS

PRIORITY APPLICATION

This application is a continuation of U.S. application Ser. No. 16/170,454, filed Oct. 25, 2018, the entire contents of which are incorporated by reference herein.

BACKGROUND

The disclosure relates to wireless communications equipment, systems, and related networks, such as Universal Mobile Telecommunications Systems (UMTSs), its offspring Long Term Evolution (LTE) and 5th Generation New Radio (5G-NR) described and being developed by the Third Generation Partnership Project (3GPP), and more particularly to supporting selective routing of carrier aggregation (CA) and multiple-input multiple-output (MIMO) data streams.

Wireless customers are increasingly demanding wireless communications services, including in areas that are poorly serviced by conventional cellular networks, such as inside certain buildings or indoor and outdoor areas where there is little cellular coverage. In this regard, wireless communications systems, such as distributed antenna systems (DASs) or cloud radio access networks (C-RANs), are being deployed to provide voice and data services to poorly serviced areas. A wireless communications system, such as a DAS, generally includes remote antenna units (RAUs) configured to receive and transmit communications signals to user equipment (e.g., wireless mobile communications devices) within the antenna range of the RAUs. A wireless communications system can be particularly useful when deployed inside a building or other indoor/outdoor environment where the use equipment may not otherwise be able to effectively receive radio frequency (RF) signals from a source.

In this regard, FIG. 1 illustrates a conventional DAS 100 that is configured to distribute communications services to remote coverage areas 102(1)-102(N), where 'N' is the number of remote coverage areas. The DAS 100 can be configured to support cellular communications services. The remote coverage areas 102(1)-102(N) are created by and located about RAUs 104(1)-104(N) connected to a central unit 106. The central unit 106 may be communicatively coupled to a base transceiver station (BTS) 108. In this regard, the central unit 106 receives data streams, including downlink communications signals 110D from the BTS 108 to be distributed to the RAUs 104(1)-104(N). The downlink communications signals 110D can include data communications signals and/or communication signaling signals on multiple frequency communications bands. The central unit 106 is configured with filtering circuits and/or other signal processing circuits that are configured to support a specific number of communications services in a particular frequency bandwidth (i.e., frequency communications bands). The downlink communications signals 110D are communicated by the central unit 106 over a communications link 112 over their frequency to the RAUs 104(1)-104(N).

With continuing reference to FIG. 1, the RAUs 104(1)-104(N) are configured to receive the downlink communications signals 110D from the central unit 106 over the communications link 112. The downlink communications signals 110D are configured to be distributed to the respective remote coverage areas 102(1)-102(N) of the RAUs 104(1)-104(N). The RAUs 104(1)-104(N) are also configured with filters and other signal processing circuits that are configured to support the communications services (i.e., frequency communications bands) supported by the central unit 106. Each of the RAUs 104(1)-104(N) includes one or more respective antennas 114(1)-114(N) in an uplink/downlink path to wirelessly distribute the communications services to user equipment 116 within the respective remote coverage areas 102(1)-102(N). The RAUs 104(1)-104(N) are also configured to receive additional data streams, including uplink communications signals 110U from the user equipment 116 in the respective remote coverage areas 102(1)-102(N) to be distributed to the BTS 108.

The user equipment 116 in any of the remote coverage areas 100(1)-100(N) may be running bandwidth-hungry applications, such as high-definition (HD) mobile video, virtual reality (VR), and augmented reality (AR) that drive the demand for high-capacity wireless access. Moreover, multiple user equipment 116 may be running such bandwidth-hungry applications concurrently, thus further increasing the demand for data throughput in each of the remote coverage areas 102(1)-102(N). As a result, the wireless communications industry has adopted technologies to increase wireless capacity and help meet the increasing bandwidth demand by the user equipment 116.

The DAS 100 in some cases may deploy MIMO technology, in which each of the remote units 104(1)-104(N) may employ multiple antennas 114(1)-114(N) to distribute multiple streams of the downlink communications signals 110D (and the uplink communications signals 110U) concurrently. For example, each of the remote units 104(1)-104(N) may employ two antennas 114(1)-114(N) to concurrently transmit two streams of the downlink communications signals 110D, thus doubling the data throughput in the remote coverage areas 100(1)-100(N). When the remote units 104(1)-104(N) distribute the multiple streams of the downlink communications signals 110D concurrently to multiple user equipment 116, the remote units 104(1)-104(N) are said to be communicating the downlink communications signals 110D based on multiuser MIMO technology. MIMO technology can help provide increased data rate/throughput, enhanced reliability, improved energy efficiency, and/or reduced interference in the remote coverage areas 102(1)-102(N). As such, MIMO technology has been incorporated into recent and evolving wireless communications standards, such as long-term evolution (LTE) and LTE-Advanced.

In other cases, the capacity of wireless communications systems, including distributed wireless communications systems such as the DAS 100 in FIG. 1, may be improved through CA. CA is a feature of LTE-advanced and newer telecommunications systems which provides for more efficient use of capacity across a set of wireless media, such as multiple wireless spectrum frequency bands. In CA, a component carrier refers to a communication channel used for data transmission. Multiple such component carriers may be combined for data transmission even where the component carriers may be transmitted on separate frequency bands. According to CA, for each user equipment 116 there is one component carrier used as a primary cell that provides control information and functions, such as Non-Access Stratum (NAS) mobility information, Radio Resource Control (RRC), and connection maintenance. In the downlink, the carrier corresponding to the primary cell is the downlink primary component carrier, while in the uplink it is the uplink primary component carrier. One or more other component carriers are referred to as secondary cells and are used for bandwidth expansion for the particular user equipment 116. The cell where an initial access is performed by the user equipment 116 is the cell which is related by the network as the primary cell. Changing of a primary cell is performed only via a handover procedure. The network can configure additional component carriers as secondary cells only for a carrier aggregation-capable device with an RRC connection on a primary cell. The configuration of secondary cells is done via dedicated RRC signaling to the user equipment 116, as well as any addition, reconfiguration or removal of secondary cells.

Due to the use of separate frequency bands for the component carriers, CA allows the DAS 100 to distribute multiple streams using a same antenna 114(1)-114(N). In this regard, FIG. 2 illustrates a conventional implementation of CA with the DAS 100 of FIG. 1. According to a conventional CA approach, the central unit 106 would transmit and receive a primary cell component carrier $CC_1$ and a secondary cell component carrier $CC_2$ from the BTS 108. Each component carrier $CC_1$, $CC_2$ is transmitted and received at a different RF carrier frequency $f_1$, $f_2$. The central unit 106 distributes both the primary cell component carrier $CC_1$ and the secondary cell component carrier $CC_2$ to all RAUs 104(1)-104(N), and the RAUs 104(1)-104(N) can transmit and receive each component carrier $CC_1$, $CC_2$ wirelessly at a different RF carrier frequency $f_1$, $f_2$ over a common antenna 114(1)-114(N). The secondary cell component carrier $CC_2$ is used to provide additional capacity in addition to the primary cell component carrier $CC_1$. Because both component carriers $CC_1$, $CC_2$ are distributed to all remote coverage areas 102(1)-102(N) of the DAS 100, no handover procedure is required for user equipment 116 which moves between remote coverage areas 102(1)-102(N).

Under conventional MIMO and CA approaches, the additional wireless capacity provided by MIMO or CA data streams (e.g., downlink communications signals 110D and/or uplink communications signals 110U) is uniformly distributed to all remote coverage areas 102(1)-102(N) regardless of conditions of the wireless communications environment. Thus, the additional capacity is not localized, and a remote coverage area 102(1) with higher wireless traffic needs does not receive an allocation of additional capacity different from the other remote coverage areas 102(2)-102(N). In addition, the DAS 100 can experience decreased throughput due to degraded signal conditions in the remote coverage areas 102(1)-102(N) of some or all RAUs 104(1)-104(N).

No admission is made that any reference cited herein constitutes prior art. Applicant reserves the right to challenge the accuracy and pertinence of any cited documents.

SUMMARY

Embodiments disclosed herein include wireless communications systems supporting selective routing of carrier aggregation (CA) and multiple-input multiple-output (MIMO) data streams. An example of a wireless communications system that can be configured to support selective routing of CA and MIMO data streams can include a wireless communications system, such as a distributed antenna system (DAS) or a cloud radio access network (C-RAN). In an exemplary aspect disclosed herein, the wireless communications system includes a signal router circuit communicatively coupled to one or more signal sources. The signal router circuit is configured to receive MIMO and CA communications signals for data transmission from the signal source(s) and distribute the communications signals (e.g., data streams) to remote units communicatively coupled to the signal router circuit. In one example, the data streams received and distributed by the signal router circuit are in baseband. The signal router circuit determines whether to route each data stream in a MIMO configuration, a CA configuration, or both to provide an improved wireless communications environment for mobile communications devices connected to the remote units. The improved wireless communications environment may increase throughput, reduce interference and/or noise, and/or improve the transmission quality of wireless communications signals.

For example, the signal router circuit can route data streams in a MIMO configuration to conserve wireless spectrum and/or improve throughput where the wireless signals have a sufficiently high signal-to-noise ratio (SNR). As another example, the signal router circuit can route data streams in a CA configuration to improve throughput and/or SNR through use of additional wireless carrier channels. In still another example, data streams can be routed in both CA and MIMO configurations to use multiple wireless carrier channels and improve the throughput per channel, but may as a consequence result in a loss of signal power. A controller circuit coupled to the routing control circuit dynamically determines whether configuring each data stream as MIMO, CA, or both will provide an improved wireless communications environment and route the data streams accordingly.

One embodiment of the disclosure relates to a wireless communications system. The wireless communications system includes a signal router circuit configured to route MIMO communications signals and CA communications signals. The signal router circuit includes a first signal source input configured to receive a first data stream and a second signal source input configured to receive a second data stream. The signal router circuit also includes a plurality of signal outputs each configured to couple to a remote unit among a plurality of remote units and a routing control input configured to receive a routing control signal. The wireless communications system also includes a controller circuit comprising a routing control output coupled to the routing control input. The controller circuit is configured to determine a first routing configuration for a first signal output of the plurality of signal outputs. Determining the first routing configuration includes determining to route the first data stream in at least one of a first MIMO configuration or a first CA configuration and determining to route the second data stream in at least one of a second MIMO configuration or a second CA configuration. The controller circuit is further configured to communicate the routing control signal indicating the first routing configuration for routing the first data stream and the second data stream to the first signal output.

An additional embodiment of the disclosure relates to a method for selectively routing a first data stream and a second data stream from one or more signal source circuits to a plurality of remote units in a wireless communications system. The method includes the steps of receiving the first data stream, receiving the second data stream, and receiving an indication of a communication condition associated with at least one of the plurality of remote units. The method further includes determining a first routing configuration, which includes determining to route the first data stream in at least one of a first MIMO configuration or a first CA configuration based on the communication condition, and determining to route the second data stream in at least one of a second MIMO configuration or a second CA configuration based on the communication condition. The method further includes routing the first data stream and the second data stream to at least a first remote unit of the plurality of remote units according to the first routing configuration.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include wireless communications systems supporting selective routing of carrier aggregation (CA) and multiple-input multiple-output (MIMO) data streams. An example of a wireless communications system that can be configured to support selective routing of CA and MIMO data streams can include a wireless communications system, such as a distributed antenna system (DAS) or a cloud radio access network (C-RAN). In an exemplary aspect disclosed herein, the wireless communications system includes a signal router circuit communicatively coupled to one or more signal sources. The signal router circuit is configured to receive MIMO and CA communications signals for data transmission from the signal source(s) and distribute the communications signals (e.g., data streams) to remote units communicatively coupled to the signal router circuit. In one example, the data streams received and distributed by the signal router circuit are in baseband. The signal router circuit determines whether to route each data stream in a MIMO configuration, a CA configuration, or both to provide an improved wireless communications environment for mobile communications devices connected to the remote units. The improved wireless communications environment may increase throughput, reduce interference and/or noise, and/or improve the transmission quality of wireless communications signals.

For example, the signal router circuit can route data streams in a MIMO configuration to conserve wireless spectrum and/or improve throughput where the wireless signals have a sufficiently high signal-to-noise ratio (SNR). As another example, the signal router circuit can route data streams in a CA configuration to improve throughput and/or SNR through use of additional wireless carrier channels. In still another example, data streams can be routed in both CA and MIMO configurations to use multiple wireless carrier channels and improve the throughput per channel, but may as a consequence result in a loss of signal power. A controller circuit coupled to the routing control circuit dynamically determines whether configuring each data stream as MIMO, CA, or both will provide an improved wireless communications environment and route the data streams accordingly.

Figure 1:
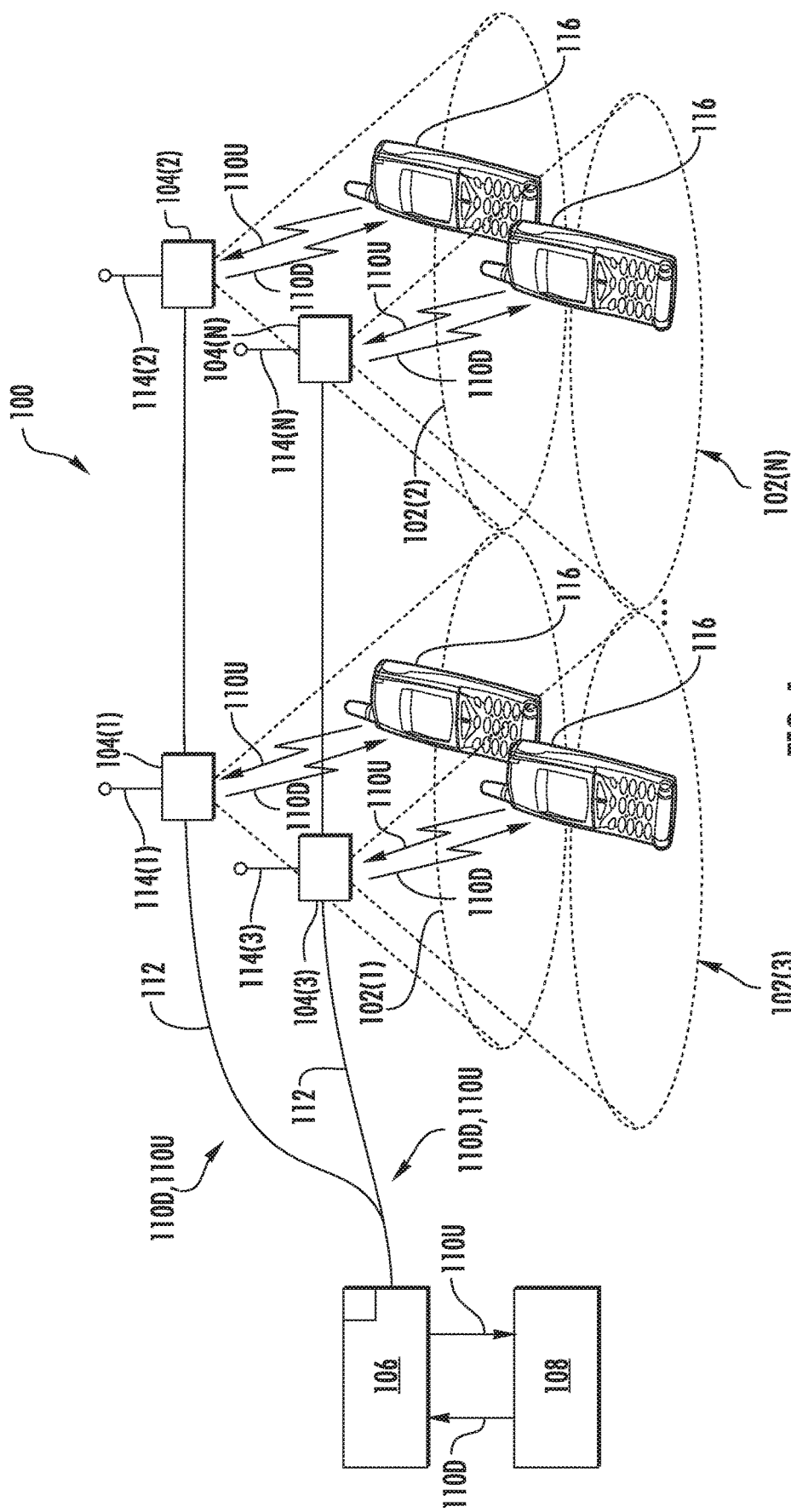
FIG. 1 is a schematic diagram of a conventional distributed antenna system (DAS) that is configured to distribute communications services to remote coverage areas.
Figure 2:
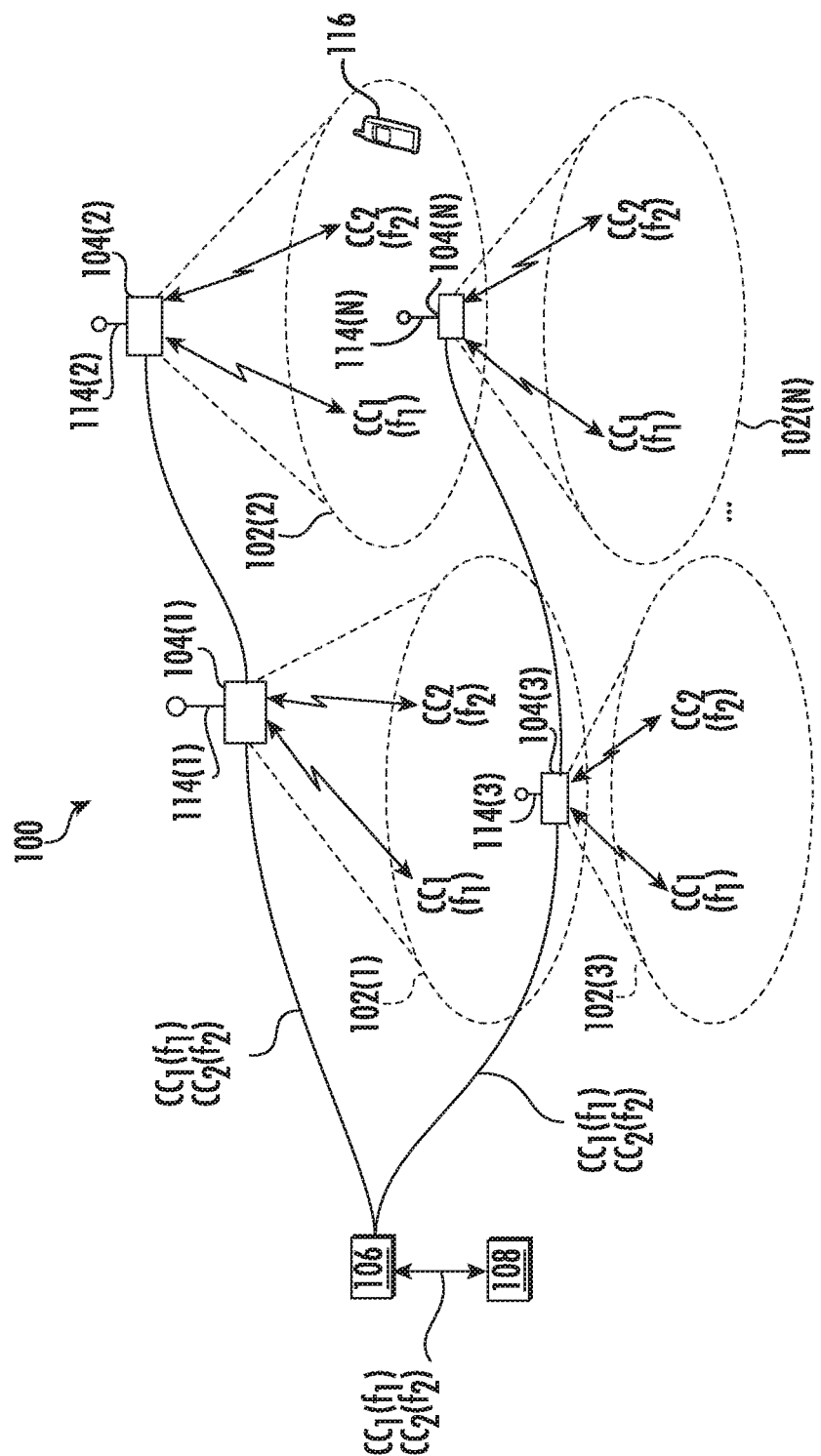
FIG. 2 is a schematic diagram of the conventional DAS of FIG. 1 distributing component carriers in a carrier aggregation (CA) scheme.
Figure 3:
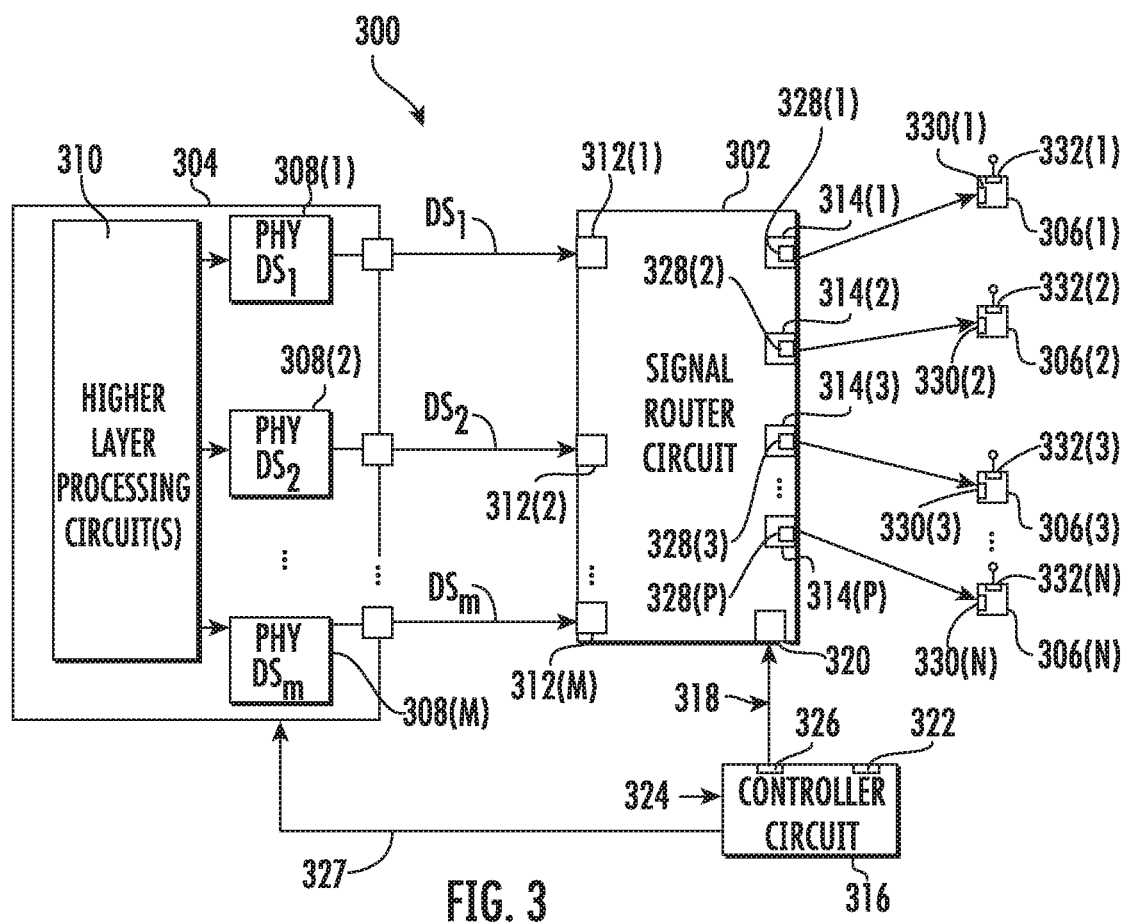
FIG. 3 is a schematic diagram of an exemplary wireless communications system supporting selective routing of CA and multiple-input multiple-output (MIMO) data streams.

In this regard, FIG. 3 illustrates an exemplary wireless communications system 300 supporting selective routing of CA and MIMO data streams. The wireless communications system 300 includes a signal router circuit 302 communicatively coupled to one or more signal source circuits 304. The signal router circuit 302 is configured to receive data streams $DS_1$-$DS_m$ from the signal source circuit 304 and distribute the data streams $DS_1$-$DS_m$. The notation "1-m" indicates that any number of data streams, 1-m, may be provided. The data streams $DS_1$-$DS_m$ can be CA data streams (e.g., component carriers) and/or MIMO data streams. The signal router circuit 302 selectively distributes the data streams $DS_1$-$DS_m$ to one or more remote units 306(1)-306(N), where 'N' is the number of remote units.

A data stream $DS_1$-$DS_m$ refers to a communication channel used for data transmission, which may include uplink and/or downlink components. Accordingly, while the signal router circuit 302 is described as "receiving" data streams $DS_1$-$DS_m$, which are "distributed" to the remote units 306(1)-306(N), for each data stream $DS_1$-$DS_m$ an uplink (transmitting information from a mobile device to a telecommunications network) and/or a downlink (transmitting information from the telecommunications network to the mobile device) may be formed between the signal router circuit 302 and the signal source circuit 304, as well as between the signal router circuit 302 and a remote unit 306(1)-306(N).

The signal router circuit 302 is configured to selectively route each data stream $DS_1$-$DS_m$ in a MIMO configuration, a CA configuration, or both to provide an improved wireless communications environment for user mobile communications devices connected to the remote units 306(1)-306(N). In this manner, the data streams $DS_1$-$DS_m$ do not need to be indiscriminately distributed to each remote unit 306(1)-306(N), but can instead be routed in a manner which can increase capacity and/or throughput where needed, conserve power, conserve wireless spectrum, reduce interference and/or noise, improve transmission quality of wireless communications signals, and so on as described further below with respect to FIGS. 4-8.

The wireless communications system 300 can be configured to support cellular communications services. In some embodiments, the signal source circuit 304 in the wireless communications system 300 may include some or all functions of an Evolved Node B (eNB) base transceiver station (BTS) implementing carrier aggregation functionality. For example, the signal source circuit 304 may transmit and receive communications, such as packetized data, from a telecommunications network. The signal source circuit 304 includes one or more physical layer (PHY) processing circuits 308(1)-308(M). The notation "1-M" indicates that any number of the PHY processing circuits, 1-M, may be provided. A PHY processing circuit 308(1)-308(M) generates baseband modulated signals representing a downlink baseband signal of a corresponding data stream $DS_1$-$DS_m$. As an example, a first PHY processing circuit 308(1) generates a first data stream $DS_1$, and may be capable of configuring the first data stream $DS_1$ for MIMO, CA, or both. It should be understood that generation of the baseband modulated signals by the PHY processing circuits 308(1)-308(M) can be implemented in other components of the wireless communications system 300, such as in the remote units 306(1)-306(N).

The PHY processing circuits 308(1)-308(M) may receive data to be transmitted from higher layer processing circuit(s) 310 of the signal source circuit 304. The higher layer processing circuits 310 may perform some or all signal processing functions of layers other than PHY of a transmitting and/or receiving device under the open systems interconnection (OSI) model or a similar communication model. In some examples, the higher layer processing circuits 310 include scheduling the data for each data stream $DS_1$-$DS_m$ to be transmitted to the signal router circuit 302 by the corresponding PHY processing circuit 308(1)-308(M). Each PHY processing circuit 308(1)-308(M) and/or the higher layer processing circuits 310 may further process uplink baseband signals received from the signal router circuit 302. It should be understood that in some embodiments, some of the functions and/or circuitry of the signal source circuit 304 may reside at the remote units 306(1)-306(N). For example, the PHY processing circuits 308(1)-308(M) may be split between the signal source circuit 304 and the remote units 306(1)-306(N) where higher level portions of the PHY processing circuits 308(1)-308(M) reside at the signal source circuit 304 and lower level portions of the PHY processing circuits 308(1)-308(M) reside at the remote units 306(1)-306(N). In other embodiments, the complete PHY processing circuits 308(1)-308(M) may reside at the remote units 306(1)-306(N).

With continuing reference to FIG. 3, the signal router circuit 302 routes the data stream(s) $DS_1$-$DS_m$ to the one or more remote units 306(1)-306(N). The signal router circuit 302 includes a plurality of signal source inputs 312(1)-312(M), each of which receives a data stream $DS_1$-$DS_m$ from the signal source circuit 304. The signal source inputs 312(1)-312(M) may be any appropriate inputs, such as parallel input ports, serially received inputs, and so on (e.g., the signal source inputs 312(1)-312(M) can be received through one or multiple physical interfaces with the signal source circuit 304). Generally, each signal source input 312(1)-312(M) is coupled to a corresponding PHY processing circuit 308(1)-308(M). It should be understood that while the PHY processing circuits 308(1)-308(M) and signal source inputs 312(1)-312(M) are shown as separate links, the data streams $DS_1$-$DS_m$ can be multiplexed over a single physical link and/or may use separate physical links for uplink and downlink paths. The data streams $DS_1$-$DS_m$ are distributed to the respective coverage areas of the remote units 306(1)-306(N) according to one or more routing configurations of the signal router circuit 302. Each routing configuration selectively directs the routing of data streams $DS_1$-$DS_m$ from the signal source inputs 312(1)-312(M) of the signal router circuit 302 to a signal output 314(1)-314(P) of the signal router circuit 302. Each signal output 314(1)-314(P) is coupled to at least one of the plurality of remote units 306(1)-306(N).

A controller circuit 316 communicates a routing control signal 318 (e.g., to a routing control input 320 of the signal router circuit 302) to the signal router circuit 302 indicating the routing configuration(s) for routing the data streams $DS_1$-$DS_m$ from the signal source inputs 312(1)-312(M) to the signal outputs 314(1)-314(P). The controller circuit 316 may be a processor, such as a microprocessor, digital controller, microcontroller, or state machine. The controller circuit 316 may also be implemented as a combination of computing devices (e.g., a combination of a DSP and a microprocessor, a plurality of microprocessors, one or more microprocessors in conjunction with a DSP core, or any other such configuration). The routing configuration(s) communicated by the controller circuit 316 may be based on inputs received over a communications interface 322 (e.g., inputs received from the signal source circuit 304, inputs received from the signal router circuit 302, inputs received from the remote units 306(1)-306(N)) and/or additional inputs 324, as described further below with respect to FIGS. 7 and 8. Exemplary routing configurations are described further below with respect to FIGS. 4-6. Through the routing control signal 318 (which may be sent to the routing control input 320 from a routing control output 326 in the controller circuit 316), the controller circuit 316 controls the signal router circuit 302 for determining how many data streams $DS_1$-$DS_m$ will be used, whether each data stream $DS_1$-$DS_m$ will be configured as MIMO, CA, or both, and which data streams $DS_1$-$DS_m$ will be routed to each remote unit 306(1)-306(N). In some embodiments, the controller circuit 316 may also control at least some functions and/or circuitry of the signal source circuit 304 and/or the remote units 306(1)-306(N). For example, the signal source circuit 304 may configure each data stream $DS_1$-$DS_m$ as MIMO, CA, or both. In some examples, the controller circuit 316 can determine whether each data stream $DS_1$-$DS_m$ will be configured as MIMO, CA, or both, and cause the signal source circuit 304 to configure the data stream $DS_1$-$DS_m$ accordingly (e.g., through a configuration control signal 327). In other examples, the data stream $DS_1$-$DS_m$ may be configured by the signal source circuit 304, and the controller circuit 316 may determine how each data stream $DS_1$-$DS_m$ should be routed and cause the signal router circuit 302 to route the data stream $DS_1$-$DS_m$ accordingly.

The controller circuit 316 may be implemented with logical circuitry and may be a standalone device, form part of another device (e.g., the signal router circuit 302, the signal source circuit 304, or a building control device), or portions of the controller circuit 316 functions and/or circuitry may reside within multiple devices (e.g., in the signal router circuit 302 or the signal source circuit 304). In some embodiments, the signal source circuit 304 may be omitted, and the signal router circuit 302 and controller circuit 316 may interface directly with an eNB or other BTS, including an analog base station. In some examples, the signal source circuit 304 may be implemented as an eNB, a base-band unit (BBU), and/or a BTS. A data stream $DS_1$-$DS_m$ in such embodiments may be received at baseband or at a radio frequency (RF) carrier frequency. In this case, the signal router circuit 302 (or another circuit connected to the signal router circuit 302) will include sampling and digitization circuitry to convert the RF data stream signal to a baseband signal for routing to the remote unit(s) 306(1)-306(N).

With continuing reference to FIG. 3, some embodiments of the wireless communications system 300 distribute the data streams $DS_1$-$DS_m$ over optical communications media. In an exemplary embodiment, each signal output 314(1)-314(P) of the signal router circuit 302 includes an electrical-to-optical (E-O) converter 328(1)-328(P) configured to convert an electrical communications signal of the respective data streams $DS_1$-$DS_m$ into a respective optical communications signal. The respective optical communications signals are transported to the remote units 306(1)-306(N) by an optical fiber communications link coupled between each signal output 314(1)-314(P) of the signal router circuit 302 and the corresponding remote unit 306(1)-306(N). Each remote unit 306(1)-306(N) includes an optical-to-electrical (O-E) converter 330(1)-330(N) configured to convert the respective optical communications signal for the data streams $DS_1$-$DS_m$ back into the electrical communications signal to interface with one or more uplink/downlink paths 332(1)-332(N) of the remote unit 306(1)-306(N). Using the electrical communications signal, each uplink/downlink path 332(1)-332(N) wirelessly distributes the data streams $DS_1$-$DS_m$ to any mobile device within the coverage area of the remote unit 306(1)-306(N).

In this exemplary embodiment, the wireless communications system 300 has been described to "distribute" data streams $DS_1$-$DS_m$. As previously discussed, it should be understood that each data stream $DS_1$-$DS_m$ may include uplink and/or downlink components. Accordingly, each E-O converter 328(1)-328(P) of the signal router circuit 302 may convert a downlink for the routed data streams $DS_1$-$DS_m$ from electrical to optical and an uplink for each data stream $DS_1$-$DS_m$ from optical to electrical. Similarly, the O-E converter 330(1)-330(N) of each remote unit 306(1)-306(N) may convert a downlink for each data stream $DS_1$-$DS_m$ from optical to electrical and an uplink for each data stream $DS_1$-$DS_m$ from electrical to optical. In addition, each optical fiber communications link may have a separate uplink and downlink medium, or may be a common optical fiber communications link. For example, wave division multiplexing (WDM) may be employed to carry the downlink optical communications signals and the uplink optical communications signals on the same optical fiber communications link.

Figure 4:
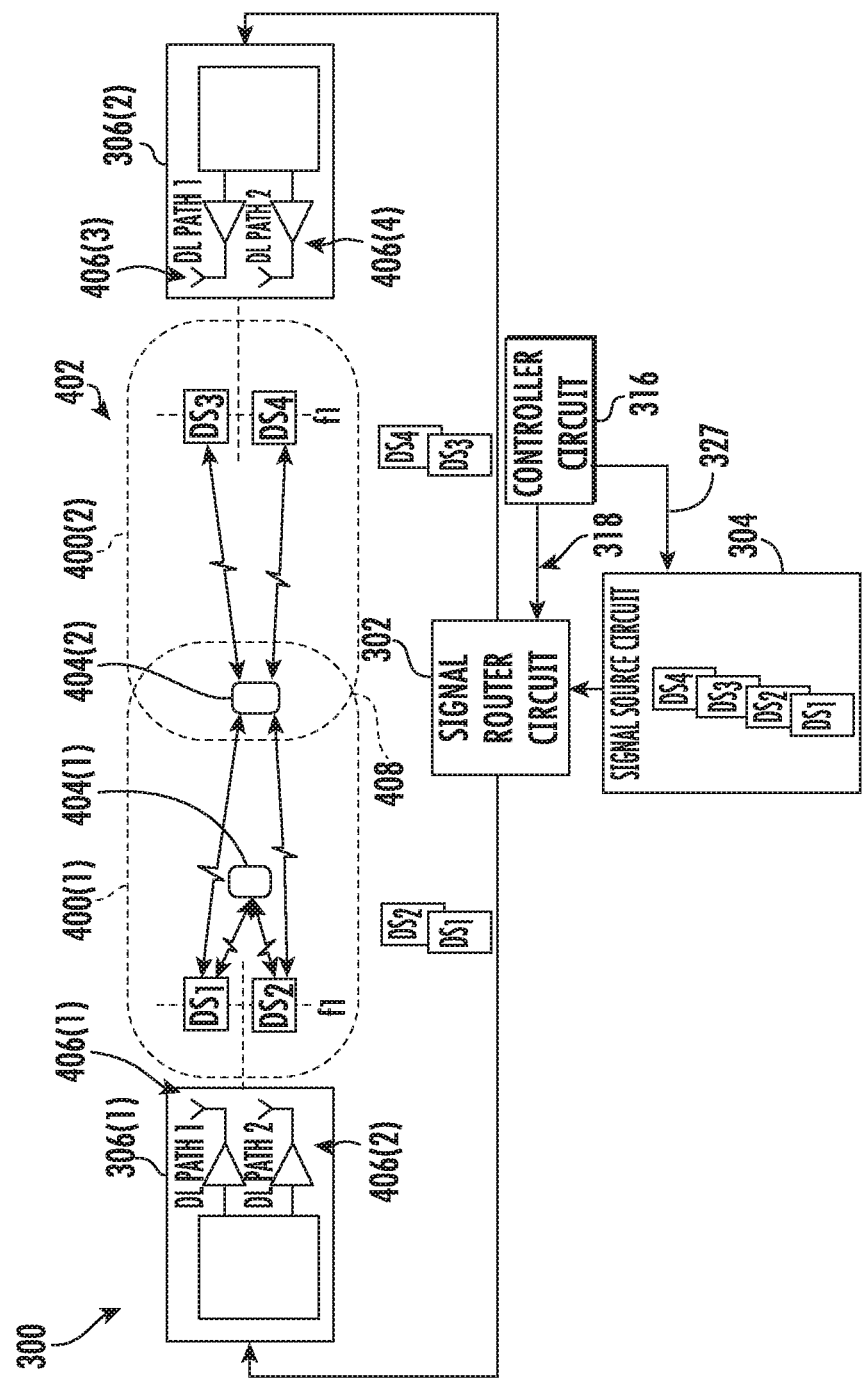
FIG. 4 is a schematic diagram illustrating an example of the wireless communications system of FIG. 3 selectively routing one or more data streams in a MIMO configuration.
Figure 5:
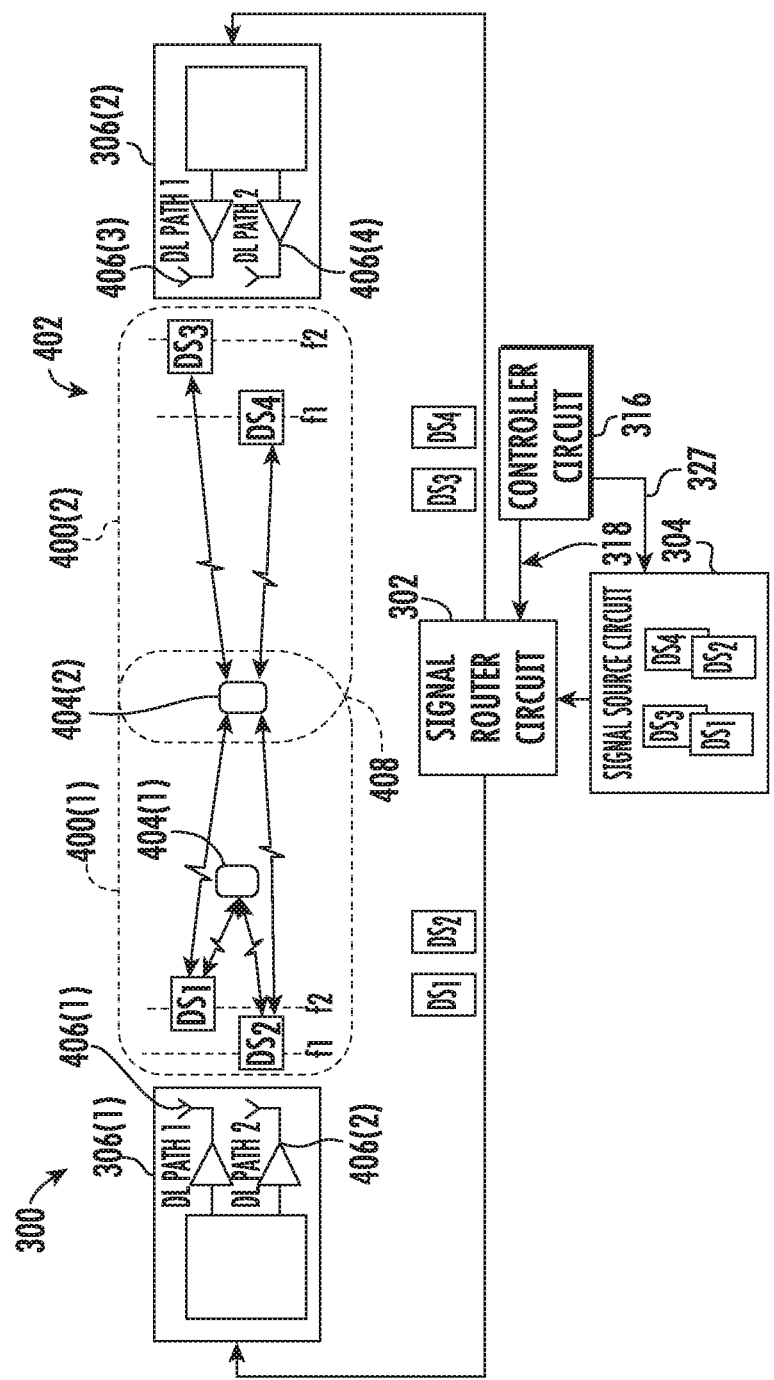
FIG. 5 is a schematic diagram illustrating an example of the wireless communications system of FIG. 3 selectively routing one or more data streams in a CA configuration.
Figure 6:
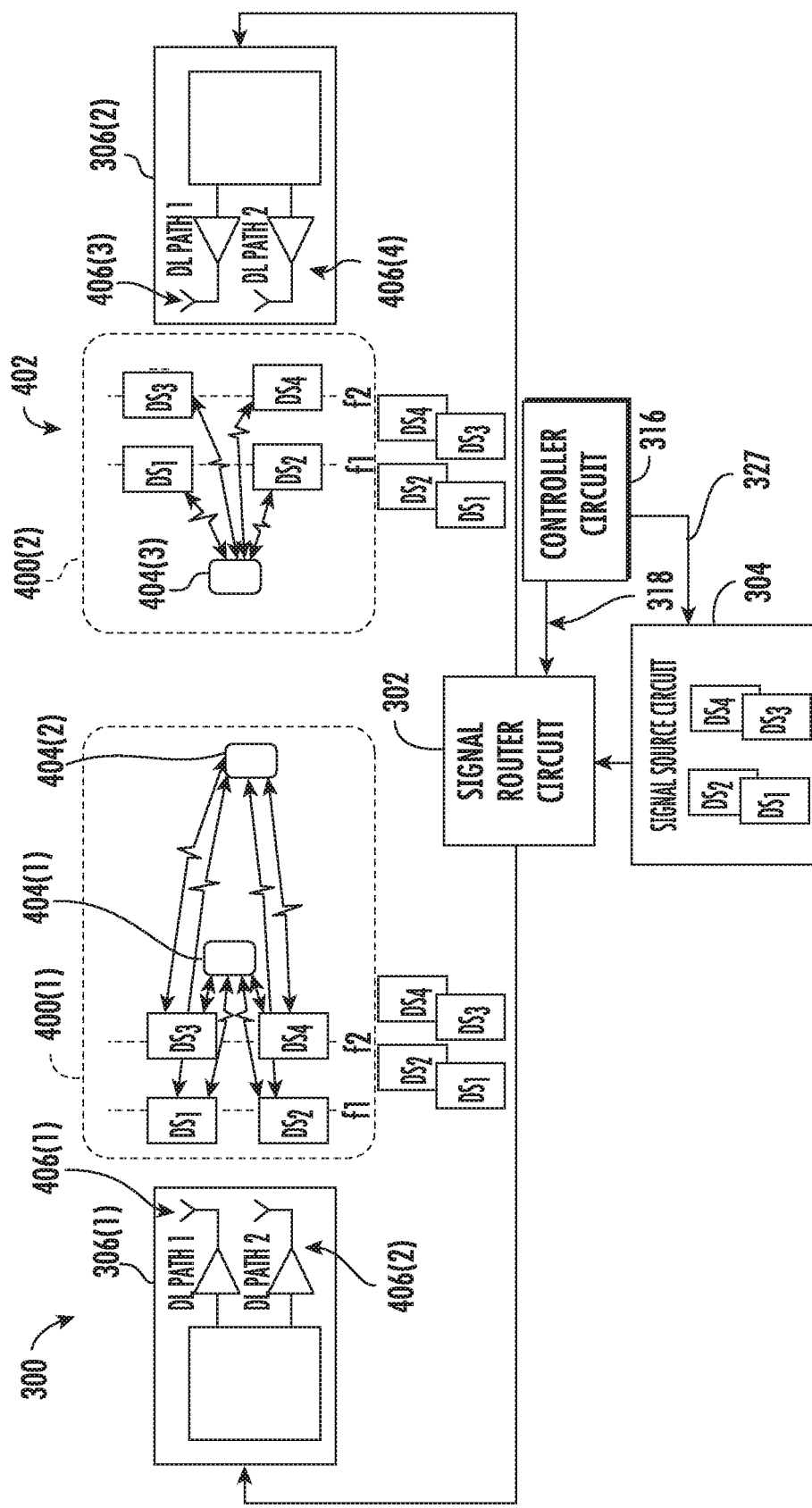
FIG. 6 is a schematic diagram illustrating an example of the wireless communications system of FIG. 3 selectively routing one or more data streams in a MIMO and CA configuration.

Turning to FIGS. 4-6, the operation and advantages of selectively distributing MIMO and CA data streams $DS_1$-$DS_m$ to the remote units 306(1), 306(2) are illustrated. The wireless communications system 300 is configured to support MIMO and CA, and selectively distribute data streams $DS_1$-$DS_4$ to remote coverage areas 400(1), 400(2) created by and located about the remote units 306(1), 306(2). It should be understood that the wireless communications system 300 in FIGS. 4-6 is depicted with two remote units 306(1), 306(2) and four data streams $DS_1$-$DS_4$ for exemplary purposes, and any number of remote units 306(1), 306(2) and any number of data streams $DS_1$-$DS_4$ may be deployed according to embodiments of this disclosure.

FIG. 4 is a schematic diagram illustrating an example of the wireless communications system 300 of FIG. 3 selectively routing one or more data streams $DS_1$-$DS_4$ in a MIMO configuration. In an exemplary aspect, the signal router circuit 302 is configured to receive data streams $DS_1$-$DS_4$ from the signal source circuit 304 and distribute the data streams $DS_1$-$DS_4$ to the remote units 306(1), 306(2). The signal router circuit 302 is configured to route the data streams $DS_1$-$DS_4$ according to one or more routing configurations received via the routing control signal 318 from the controller circuit 316. In this regard, the controller circuit 316 is configured to determine a first routing configuration for a first remote unit 306(1) (e.g., for a first signal output 314(1) of FIG. 3) and a second routing configuration for a second remote unit 306(2) (e.g., for a second signal output 314(2) of FIG. 3).

In determining each routing configuration, the controller circuit 316 determines at least one data stream $DS_1$-$DS_4$ to route to the respective remote unit 306(1), 306(2), as well as whether the data stream $DS_1$-$DS_4$ is to be routed in a MIMO configuration, in a CA configuration (e.g., as a component carrier), or both. As described above with respect to FIG. 3, the signal source circuit 304 may configure each data stream $DS_1$-$DS_m$ as MIMO, CA, or both. Thus, in some examples, the controller circuit 316 can determine whether each data stream $DS_1$-$DS_m$ will be configured as MIMO, CA, or both, and cause the signal source circuit 304 to configure the data stream $DS_1$-$DS_m$ accordingly. In other examples, the data stream $DS_1$-$DS_m$ may be configured by the signal source circuit 304, and the controller circuit 316 may determine how each data stream $DS_1$-$DS_m$ should be routed and cause the signal router circuit 302 to route the data stream $DS_1$-$DS_m$ accordingly. The routing configurations may be based on one or more communication conditions, which may be based on inputs to the controller circuit 316, as further described below with respect to FIGS. 7 and 8.

Each routing configuration can be determined based on desired factors, such as one or more communication conditions, to improve a wireless communications environment 402 of user mobile communications devices 404(1), 404(2) in communication with the one or more remote units 306(1), 306(2). As an example, communication conditions on which the routing configurations can be determined include locations and/or a distribution of the user mobile communications devices 404(1), 404(2), the quality of signals received by the user mobile communications devices 404(1), 404(2) and/or the remote units 306(1), 306(2), noise or interference measurements, and estimates or measurements of throughput of the user mobile communications devices 404(1), 404(2) and/or the remote units 306(1), 306(2). In addition, routing configurations can be determined based on capabilities of the signal source circuit 304 and/or capabilities of each remote unit 306(1), 306(2) (e.g., a number of available downlink paths 406(1)-406(4) and/or uplink paths). In this manner, the routing configurations can facilitate an improved wireless communications environment 402 which can increase capacity and/or throughput where needed, conserve power, conserve wireless spectrum, reduce interference and/or noise, improve transmission quality of wireless communications signals, and so on.

For example, as depicted in FIG. 4, the controller circuit 316 determines a first routing configuration for the first remote unit 306(1), and the signal router circuit 302 accordingly routes a first data stream $DS_1$ and a second data stream $DS_2$ to the first remote unit 306(1). The first data stream $DS_1$ is distributed to user mobile communications devices 404(1), 404(2) in the first remote coverage area 400(1) in a first MIMO configuration, and the second data stream $DS_2$ is similarly distributed in a second MIMO configuration which is interleaved with the first data stream. In some examples, the controller circuit 316 can cause the signal source circuit 304 to configure the first data stream $DS_1$ in the first MIMO configuration and the second data stream $DS_2$ in the second MIMO configuration through the configuration control signal 327. In other words, the first data stream $DS_1$ is transmitted according to a MIMO scheme over a first wireless channel (e.g., frequency range) $f_1$ via a first downlink path 406(1) (which may include transmit circuitry and an antenna) in the first remote unit 306(1), and the second data stream $DS_2$ is transmitted according to the MIMO scheme over the first wireless channel $f_1$ via a second downlink path 406(2) (which may include distinct transmit circuitry and/or another antenna) in the first remote unit 306(1). Because the first data stream $DS_1$ and the second data stream $DS_2$ are transmitted over separate downlink paths 406(1), 406(2) under MIMO, the throughput within the first remote coverage area 400(1) can be increased.

In this regard, a first user mobile communications device 404(1), which may be near the first remote unit 306(1) (e.g., within a threshold distance), can receive the first data stream $DS_1$ and the second data stream $DS_2$ through 2×2 MIMO, in which the two data streams $DS_1$, $DS_2$ are transmitted and/or received through two antennas (e.g., separate downlink paths 406(1), 406(2)). Depending on signal conditions, the throughput to the first user mobile communications device 404(1) may be as much as double the throughput of a single, non-MIMO data stream. In addition, the throughput gains can be achieved using only one wireless channel $f_1$. However, MIMO can be affected by signal attenuation and interference, such that throughput is generally decreased with distance from the first remote unit 306(1) or where significant interference is present on the first wireless channel $f_1$. For example, the second user mobile communications device 404(2), which is further from the first remote unit 306(1), may also receive the first data stream $DS_1$ and the second data stream $DS_2$. However, the throughput of the second user mobile communications device 404(2) through the first data stream $DS_1$ and the second data stream $DS_2$ may be less than the throughput of the first user mobile communications device 404(1).

With continuing reference to FIG. 4, the controller circuit 316 also determines a second routing configuration for the second remote unit 306(2), and the signal router circuit 302 accordingly routes a third data stream $DS_3$ and a fourth data stream $DS_4$ to the second remote unit 306(2). The third data stream $DS_3$ is distributed to user mobile communications device 404(2) in the second remote coverage area 400(2) in a third MIMO configuration, and the fourth data stream $DS_4$ is similarly distributed in a fourth MIMO configuration which is interleaved with the third data stream. In some examples, the controller circuit 316 can cause the signal source circuit 304 to configure the third data stream $DS_3$ in the third MIMO configuration and the fourth data stream $DS_4$ in the fourth MIMO configuration through the configuration control signal 327. In other words, the third data stream $DS_3$ is transmitted according to a MIMO scheme over the first wireless channel $f_1$ via a first downlink path 406(3) in the second remote unit 306(2), and the fourth data stream $DS_4$ is transmitted according to the MIMO scheme over the first wireless channel $f_1$ via a second downlink path 406(4) in the second remote unit 306(2). Because the third data stream $DS_3$ and the fourth data stream $DS_4$ are transmitted over separate downlink paths 406(3), 406(4) under MIMO, the throughput within the second remote coverage area 400(2) can be increased.

In this regard, throughput can be increased for user mobile communications devices within the second remote coverage area 400(2). In addition, the second user mobile communications device 404(2) can be within an overlapping coverage area 408 (e.g., overlapping region) of the first remote coverage area 400(1) and the second remote coverage area 400(2). Because of this, the second remote unit 306(2) can receive the first data stream $DS_1$, the second data stream $DS_2$, the third data stream $DS_3$, and the fourth data stream $DS_4$ through 4×4 MIMO, in which the four data streams $DS_1$-$DS_4$ are transmitted and/or received through four antennas. In this regard, all of the first data stream $DS_1$, the second data stream $DS_2$, the third data stream $DS_3$, and the fourth data stream $DS_4$ can be interleaved with each other under MIMO. The throughput of the second remote unit 306(2), which may be decreased under 2×2 MIMO from signal attenuation due to its distance from the first remote unit 306(1) and the second remote unit 306(2), can be increased through the availability of additional data streams under 4×4 MIMO.

In this manner, in the example first configuration for the first remote unit 306(1) and second configuration for the second remote unit 306(2), throughput to some or all of the user mobile communications devices 404(1), 404(2) can be increased through MIMO. In addition, the amount of spectrum (e.g., frequency channels) occupied can be reduced, allowing for conservation of spectrum and/or due to environmental constraints. With a separate downlink path 406(1)-406(4) for each data stream $DS_1$-$DS_4$, each data stream $DS_1$-$DS_4$ may be transmitted at full power, which may limit signal attenuation due to distance and/or interference. However, if there are higher levels of interference in the wireless environment 402 and/or user mobile communications devices 404(1), 404(2) are farther from the remote units 306(1), 306(2), routing the data streams $DS_1$-$DS_4$ in MIMO may have a smaller increase in throughput.

FIG. 5 is a schematic diagram illustrating an example of the wireless communications system 300 of FIG. 3 selectively routing one or more data streams $DS_1$-$DS_4$ in a CA configuration. Similar to the example depicted in FIG. 4, the signal router circuit 302 is configured to receive data streams $DS_1$-$DS_4$ from the signal source circuit 304 and distribute the data streams $DS_1$-$DS_4$ to the remote units 306(1), 306(2). The signal router circuit 302 is configured to route the data streams $DS_1$-$DS_4$ according to one or more routing configurations received via the routing control signal 318 from the controller circuit 316.

In the example depicted in FIG. 5, the controller circuit 316 determines a first routing configuration for the first remote unit 306(1), and the signal router circuit 302 accordingly routes a first data stream $DS_1$ and a second data stream $DS_2$ to the first remote unit 306(1). The first data stream $DS_1$ is distributed to user mobile communications devices 404(1), 404(2) in the first remote coverage area 400(1) in a first CA configuration (e.g., as a first component carrier), and the second data stream $DS_2$ is similarly distributed in a second CA configuration (e.g., as a second component carrier). In some examples, the controller circuit 316 can cause the signal source circuit 304 to configure the first data stream $DS_1$ in the first CA configuration and the second data stream $DS_2$ in the second CA configuration through the configuration control signal 327. In other words, the first data stream $DS_1$ is transmitted according to a CA scheme over a first wireless channel $f_1$ via a first downlink path 406(1) in the first remote unit 306(1), and the second data stream $DS_2$ is transmitted according to the CA scheme over a second wireless channel $f_2$ via a second downlink path 406(2) in the first remote unit 306(1). Because the first data stream $DS_1$ and the second data stream $DS_2$ are transmitted over separate wireless channels $f_1$, $f_2$ under CA, the throughput within the first remote coverage area 400(1) can be increased.

In this regard, each of the first user mobile communications device 404(1) and the second user mobile communications device 404(2) can receive the first data stream $DS_1$ over the first wireless channel $f_1$ and receive the second data stream $DS_2$ over the second wireless channel $f_2$. With the use of two wireless channels $f_1$, $f_2$, the throughput under CA can be as much as double the throughput of a single, non-CA data stream transmitted over a single channel. In addition, in comparison with the MIMO configuration of FIG. 4, transmitting the first data stream $DS_1$ and the second data stream $DS_2$ over different wireless channels $f_1$, $f_2$ is less affected by signal conditions (e.g., increases in distance from the first remote unit 306(1) or interference). However, the throughput gains are achieved through use of additional wireless spectrum, which may in some cases be undesirable or unavailable.

With continuing reference to FIG. 5, the controller circuit 316 also determines a second routing configuration for the second remote unit 306(2), and the signal router circuit 302 accordingly routes a third data stream $DS_3$ and a fourth data stream $DS_4$ to the second remote unit 306(2). The third data stream $DS_3$ is distributed to user mobile communications device 404(2) in the second remote coverage area 400(2) in a third CA configuration (e.g., as a third component carrier), and the fourth data stream $DS_4$ is similarly distributed in a fourth CA configuration (e.g., as a fourth component carrier). In some examples, the controller circuit 316 can cause the signal source circuit 304 to configure the third data stream $DS_3$ in the third CA configuration and the fourth data stream $DS_4$ in the fourth CA configuration through the configuration control signal 327. In other words, the third data stream $DS_3$ is transmitted according to a CA scheme over the first wireless channel $f_1$ via a first downlink path 406(3) in the second remote unit 306(2), and the fourth data stream $DS_4$ is transmitted according to the CA scheme over the second wireless channel $f_2$ via a second downlink path 406(4) in the second remote unit 306(2). Because the third data stream $DS_3$ and the fourth data stream $DS_4$ are transmitted over separate wireless channels $f_1$, $f_2$ under CA, the throughput within the second remote coverage area 400(2) can be increased.

In this regard, throughput can be increased for user mobile communications device 404(2) within the second remote coverage area 400(2). In addition, the second user mobile communications device 404(2) can be within an overlapping coverage area 408 (e.g., overlapping region) of the first remote coverage area 400(1) and the second remote coverage area 400(2). Because of this, the second remote unit 306(2) can receive the first data stream $DS_1$ interleaved in a MIMO configuration with the third data stream $DS_3$, and the second data stream $DS_2$ interleaved in a MIMO configuration with the fourth data stream $DS_4$, which may further increase throughput in the overlapping coverage area 408. This increased throughput can be achieved with less throughput reduction due to distance as compared with the MIMO configurations of FIG. 4.

In this manner, in the example of the first configuration for the first remote unit 306(1) and the second configuration for the second remote unit 306(2), throughput to some or both of the user mobile communications devices 404(1), 404(2) can be increased through CA. In addition, the throughput of the data streams $DS_1$-$DS_4$ can be less susceptible to signal attenuation due to distance and/or interference as compared with the MIMO configurations in the example of FIG. 4. With a separate downlink path 406(1)-406(4) for each data stream $DS_1$-$DS_4$, each data stream $DS_1$-$DS_4$ may be transmitted at full power, which may further limit signal attenuation due to distance and/or interference. However, the amount of spectrum (e.g., frequency channels) occupied is increased under CA.

FIG. 6 is a schematic diagram illustrating an example of the wireless communications system 300 of FIG. 3 selectively routing one or more data streams $DS_1$-$DS_4$ in a MIMO and CA configuration. Similar to the example depicted in FIG. 4, the signal router circuit 302 is configured to receive data streams $DS_1$-$DS_4$ from the signal source circuit 304 and distribute the data streams $DS_1$-$DS_4$ to the remote units 306(1), 306(2). The signal router circuit 302 is configured to route the data streams $DS_1$-$DS_4$ according to one or more routing configurations received via the routing control signal 318 from the controller circuit 316.

In the example depicted in FIG. 6, the controller circuit 316 determines a first routing configuration for the first remote unit 306(1), and the signal router circuit 302 accordingly routes a first data stream $DS_1$, a second data stream $DS_2$, a third data stream $DS_3$, and a fourth data stream $DS_4$ to the first remote unit 306(1). The first data stream $DS_1$ is distributed to user mobile communications devices 404(1), 404(2) in the first remote coverage area 400(1) in a first CA configuration and in a first MIMO configuration. The second data stream $DS_2$ is similarly distributed in a second CA configuration and in a second MIMO configuration interleaved with the first data stream $DS_1$. The third data stream $DS_3$ is similarly distributed in a third CA configuration and in a third MIMO configuration. The fourth data stream $DS_4$ is similarly distributed in a fourth CA configuration and in a fourth MIMO configuration interleaved with the third data stream $DS_3$. In some examples, the controller circuit 316 can cause the signal source circuit 304 to configure the first data stream $DS_1$ in the first CA configuration and the first MIMO configuration, configure the second data stream $DS_2$ in the second CA configuration and the second MIMO configuration, configure the third data stream $DS_3$ in the third CA configuration and the third MIMO configuration, and configure the fourth data stream $DS_4$ in the fourth CA configuration and the fourth MIMO configuration through the configuration control signal 327.

In other words, the first data stream $DS_1$ and the third data stream $DS_3$ are transmitted via a first downlink path 406(1) in the first remote unit 306(1) according to a CA scheme in which the first data stream $DS_1$ is transmitted over a first wireless channel $f_1$, and the third data stream $DS_3$ is transmitted over a second wireless channel $f_2$. The second data stream $DS_2$ and the fourth data stream $DS_4$ are transmitted via a second downlink path 406(2) in the first remote unit 306(1) according to a CA scheme in which the second data stream $DS_2$ is transmitted over the first wireless channel $f_1$, and the fourth data stream $DS_4$ is transmitted over the second wireless channel $f_2$. Due to the use of both MIMO and CA, the throughput within the first remote coverage area 400(1) can be increased.

In this regard, each of a first user mobile communications device 404(1) and a second user mobile communications device 404(2) can receive the first data stream $DS_1$ and the second data stream $DS_2$ over the first wireless channel $f_1$ through 2×2 MIMO, in which the two data streams $DS_1$, $DS_2$ are transmitted and/or received through two antennas (e.g., separate downlink paths 406(1), 406(2)). The first user mobile communications device 404(1) and the second user mobile communications device 404(2) can also receive the third data stream $DS_3$ and the fourth data stream $DS_4$ over the second wireless channel $f_2$ through 2×2 MIMO. The combination of CA and MIMO provides four data streams $DS_1$-$DS_4$ to each user mobile communications device 404(1), 404(2) in the first remote coverage area 400(1) at a cost of transmit power due to the aggregation of two data streams $DS_1$-$DS_4$ over each downlink path 406(1), 406(2). Depending on signal conditions, with the use of 2×2 MIMO and two wireless channels $f_1$, $f_2$, the throughput under MIMO and CA can be as much as four times the throughput of a single, non-MIMO and non-CA data stream transmitted over a single channel. However, MIMO can be affected by signal attenuation and interference, such that throughput is generally decreased with distance from the first remote unit 306(1) or where significant interference is present on the first wireless channel $f_1$. This is compounded by a corresponding decrease in output power for each data stream $DS_1$-$DS_4$ due to CA over a single downlink path 406(1), 406(2).

Generally, in CA over a single downlink path 406(1)-406(4), a respective remote unit 306(1), 306(2) provides each downlink path 406(1)-406(4) an amount of composite power for data transmission. As an example, fourteen (14) decibels per milliwatt (dBm) of composite power may be available for each downlink path 406(1)-406(4) supported by the remote unit 306(1), 306(2). The fourteen (14) dBm per band needs to be shared between all wireless channels (e.g., RF carrier frequencies). The typical coverage area per downlink path 406(1)-406(4) heavily depends on power per channel and frequently becomes a limiting factor when multiple channels need to be supported. In the case where multiple component carriers are provided for a given downlink path 406(1)-406(4), the coverage area of the remote unit 306(1), 306(2) (or of the data streams supported by the downlink path 406(1)-406(4)) is significantly decreased. As an example, if eight (8) wireless channels are used for the given downlink path 406(1)-406(4), the power per wireless channel is five (5) dBm. As another example, if twelve channels are used for the given downlink path 406(1)-406(4), the power per channel is reduced to 3.2 dBm. In this manner, throughput can be reduced for the second user mobile communications device 404(2) which is located farther away from the first remote unit 306(1).

With continuing reference to FIG. 6, the controller circuit 316 also determines a second routing configuration for the second remote unit 306(2), and the signal router circuit 302 accordingly routes the first data stream $DS_1$, the second data stream $DS_2$, the third data stream $DS_3$, and the fourth data stream $DS_4$ to the first remote unit 306(1). The data streams $DS_1$-$DS_4$ may be routed similar to the first routing configuration, with the first data stream $DS_1$ and the third data stream $DS_3$ being transmitted via a first downlink path 406(3) in the second remote unit 306(2) according to a CA scheme, and the second data stream $DS_2$ and the fourth data stream $DS_4$ being transmitted via a second downlink path 406(4) in the second remote unit 306(2) according to a CA scheme. A user mobile communications device 404(3) in the second remote coverage area 400(2) can receive the first data stream $DS_1$ and the second data stream $DS_2$ over the first wireless channel $f_1$ through 2×2 MIMO. The user mobile communications devices 404(3) in the second remote coverage area 400(2) can also receive the third data stream $DS_3$ and the fourth data stream $DS_4$ over the second wireless channel $f_2$ through 2×2 MIMO. Due to the use of both MIMO and CA, the throughput within the second remote coverage area 400(2) can be increased in a manner similar to the first remote coverage area 400(1).

In addition, if a user mobile communications device 404(1), 404(2) in the first remote coverage area 400(1) moves to the second remote coverage area 400(2) (or vice versa), access to each of the data streams $DS_1$-$DS_4$ may be maintained without a need to establish connection to new data streams $DS_1$-$DS_4$. In other examples, the second routing configuration can route different data streams $DS_1$-$DS_4$ to the second remote unit 306(2) in a similar or different manner according to communication conditions.

In this manner, in the example of the first configuration for the first remote unit 306(1) and the second configuration for the second remote unit 306(2), throughput to some or all of the user mobile communications devices 404(1), 404(2) can be increased through the combination of MIMO and CA, potentially above the examples of FIGS. 4 and 5. However, the size of each remote unit's 306(1), 306(2) coverage area 400(1), 400(2) may be decreased and/or signal power per data stream $DS_1$-$DS_m$ received by the user mobile communications devices 404(1), 404(2) may decrease, such that this configuration may be best used when user mobile communications devices 404(1)-404(3) are distributed near the remote unit(s) 306(1), 306(2) (e.g., within a threshold distance).

Figure 7:
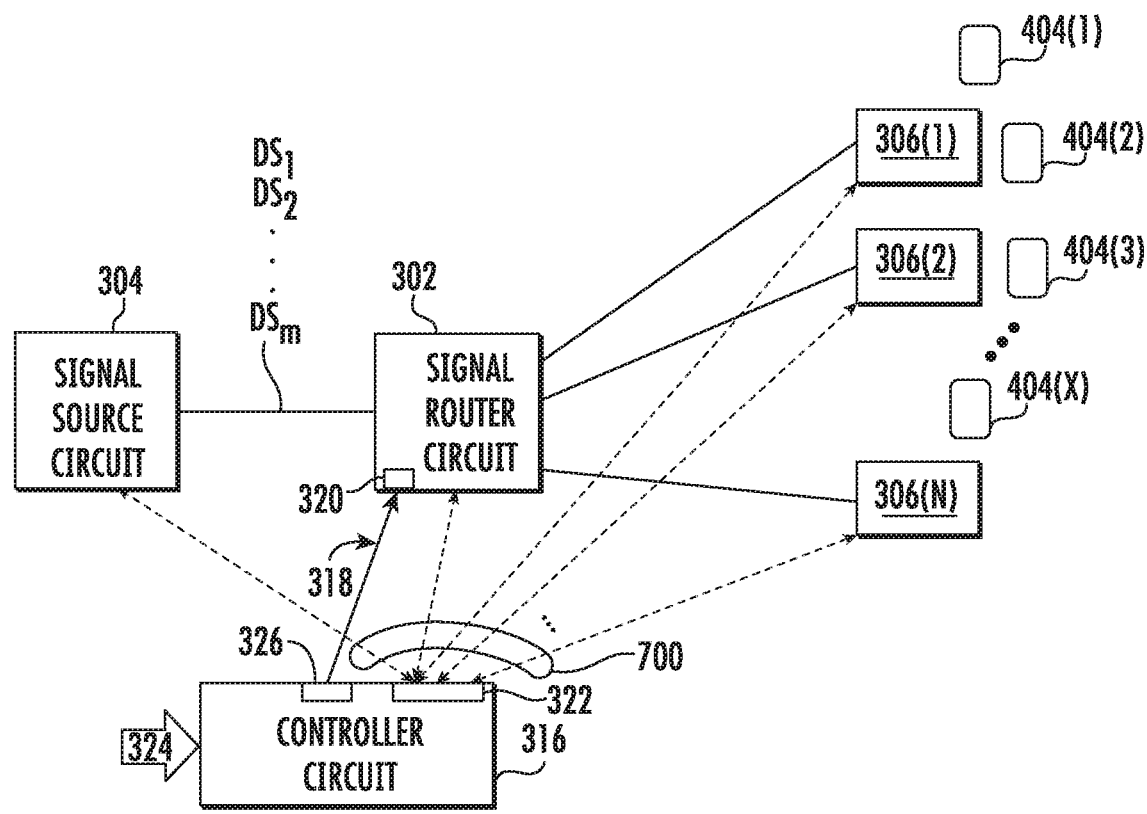
FIG. 7 is another schematic diagram of the exemplary wireless communications system of FIGS. 3-6 illustrating connections between a controller circuit and other components of the wireless communications system.

Turning to FIG. 7, the signal router circuit 302 is configured to selectively route data streams $DS_1$-$DS_m$ to the remote units 306(1)-306(N) based on communication conditions. FIG. 7 is another schematic diagram of the exemplary wireless communications system 300 of FIGS. 3-6 illustrating connections between the controller circuit 316 and other components of the wireless communications system 300. The controller circuit 316 is configured to determine a routing configuration for each of one or more remote units 306(1)-306(N). In determining each routing configuration, the controller circuit 316 determines at least one data stream $DS_1$-$DS_m$ to route from the signal source circuit 304, through the signal router circuit 302, and to the respective remote unit 306(1)-306(N). In some examples, the controller circuit 316 also determines whether each data stream $DS_1$-$DS_m$ is to be routed in a MIMO configuration, in a CA configuration (e.g., as a component carrier), or both and cause the signal source circuit 304 to configure the data stream $DS_1$-$DS_m$ accordingly. In other examples, the controller circuit 316 determines where to route the data streams $DS_1$-$DS_m$ based on whether the data streams $DS_1$-$DS_m$ are configured in a MIMO configuration, in a CA configuration (e.g., as a component carrier), or both by the signal source circuit 304. The routing configurations may be based on one or more communication conditions, which may be based on inputs to the controller circuit 316.

In this regard, the controller circuit 316 communicates one or more routing configurations from the routing control output 326 through the routing control signal 318 to a routing control input 320 of the signal router circuit 302. The controller circuit 316 can determine the routing configuration(s) based on inputs received over the communications interface 322. For example, the controller circuit 316 can exchange communications 700 with the signal source circuit 304, the signal router circuit 302, and each remote unit 306(1)-306(N) over the communications interface 322. It should be understood that while FIG. 7 depicts the controller circuit 316 exchanging communications 700 directly with each of the signal source circuit 304, the signal router circuit 302, and the remote units 306(1)-306(N) directly, in other examples these communications 700 can be exchanged indirectly, such as through the signal router circuit 302. In some examples, the routing control output 326 and the communications interface 322 can be a shared interface, such as a parallel interface or a serial interface.

In an exemplary aspect, the controller circuit 316 can receive communications 700 over the communications interface 322, which can include an indication of one or more communication conditions. The routing configuration(s) can be determined based on the one or more communication conditions. For example, the communication conditions may include a location of one or more user mobile communications devices 404(1)-404(X), and may additionally include a distribution of multiple user mobile communications devices 404(1)-404(X) about the remote units 306(1)-306(N). An indication of the location and/or distribution can be received through the communication interface 322 from the remote units 306(1)-306(N) (e.g., through a connection to each remote unit 306(1)-306(N) or indirectly through the signal router circuit 302, a proxy device, or otherwise).

In this regard, the controller circuit 316 can determine the routing configurations based on the received location and/or distribution of user mobile communications devices 404(1)-404(X). For example, if a majority of user mobile communications devices 404(1)-404(X) are located within an overlapping coverage area between a first remote unit 306(1) and a second remote unit 306(2), the controller circuit 316 can determine a first routing configuration for the first remote unit 306(1) to route one or more data streams $DS_1$-$DS_m$ in a CA configuration. The controller circuit 316 can also determine a second routing configuration for the second remote unit 306(2) to route one or more additional data streams $DS_1$-$DS_m$ in a CA configuration. The second routing configuration can additionally interleave data streams $DS_1$-$DS_m$ for the second remote unit 306(2) with data streams $DS_1$-$DS_m$ for the first remote unit 306(1) in a MIMO configuration, in a manner such as described above with respect to FIG. 5.

In another example, if a majority of user mobile communications devices 404(1)-404(X) are located near the remote units 306(1)-306(N) (e.g., within a threshold distance of each remote unit 306(1)-306(N)), the controller circuit 316 can determine a first routing configuration for a first remote unit 306(1) to route one or more data streams $DS_1$-$DS_m$ in a MIMO configuration. The controller circuit 316 can also determine additional routing configurations of other remote units 306(2)-306(N) to route one or more additional data streams $DS_1$-$DS_m$ in a MIMO configuration, such as described above with respect to FIG. 4. Each routing configuration can additionally route data streams $DS_1$-$DS_m$ in a CA configuration, such as described above with respect to FIG. 6.

In another exemplary aspect, the communication conditions may include a measurement or estimates of signal quality associated with one or more remote units 306(1)-306(N). Such measurements or estimations may include SNR measurements based on indications received over the communications interface 322. Such measurements or estimations can include indications of SNR measured from the user mobile communications devices 404(1)-404(X) and/or the remote units 306(1)-306(N), noise or interference measurements from other sensors or devices, and so on.

In this regard, the controller circuit 316 can determine the routing configurations based on the received signal quality measurements and/or estimates. For example, if a measured SNR associated with a first remote unit 306(1) exceeds a threshold value, the controller circuit 316 can determine a first routing configuration for the first remote unit 306(1) to route multiple data streams $DS_1$-$DS_m$ in a MIMO configuration, such as described above with respect to FIG. 4. Depending on the SNR value (e.g., if the SNR exceeds an additional, higher threshold), the controller circuit 316 can further determine to route the data streams $DS_1$-$DS_m$ in a CA configuration, such as described above with respect to FIG. 6.

In another example, if the measured SNR associated with the first remote unit 306(1) does not exceed a threshold value (e.g., the same or a different threshold value), the controller circuit 316 can determine the first routing configuration for the first remote unit 306(1) to route multiple data streams $DS_1$-$DS_m$ in a CA configuration, such as described above with respect to FIG. 5. Depending on the SNR value (e.g., if the SNR exceeds an additional, lower threshold), the controller circuit 316 can further determine to route the data streams $DS_1$-$DS_m$ in a MIMO configuration interleaved with data streams $DS_1$-$DS_m$ of an adjacent, second remote unit 306(2).

In another exemplary aspect, the communication conditions may include a measurement or estimate of throughput for different routing configurations. For example, the controller circuit 316 can predict throughputs for two or more potential routing configurations (e.g., MIMO, CA, or a combination of the two such as described above with respect to FIGS. 4-6). The controller circuit 316 can base a throughput estimate on current communication conditions, such as a distribution of user mobile communications devices 404(1)-404(X), measured SNR, noise, and/or interference, historical throughput measurements, and so on. Based on the estimated throughput, the controller circuit 316 can determine routing configurations which improve throughput, and may additionally adjust the routing configurations based on measured throughput of the remote units 306(1)-306(N) and/or user mobile communications devices 404(1)-404(X).

In addition, routing configurations can be determined based on capabilities of the signal source circuit 304 and/or capabilities of each remote unit 306(1), 306(2) (e.g., a number of available downlink paths 406(1)-406(4) and/or uplink paths). For example, the communications 700 received over the communications interface 322 can include indications of whether the signal source circuit 304 is capable of supporting MIMO and/or CA, a number of supported data streams $DS_1$-$DS_m$ (e.g., a number of PHY processing circuits 308(1)-308(M) available), and so on. The communications 700 received over the communications interface 322 can also include indications of whether each remote unit 306(1)-306(N) is capable of supporting MIMO and/or CA, a number of downlink paths available, and so on.

In another exemplary aspect, the controller circuit 316 is configured to transmit communications 700 over the communications interface 322, such as to configure the signal source circuit 304 and/or the remote units 306(1)-306(N) according to the determined routing configurations. In exemplary aspects disclosed herein, the signal source circuit 304 can configure (e.g., through the PHY processing circuits 308(1)-308(M) depicted in FIG. 3) each data stream $DS_1$-$DS_m$ as MIMO, CA, or both (including coordinating MIMO configurations between data streams $DS_1$-$DS_m$). For example, the controller circuit 316 can determine one or more routing configurations indicating a number of data streams $DS_1$-$DS_m$ to be routed by the signal router circuit 302 and whether each data stream $DS_1$-$DS_m$ should be configured as MIMO, CA, or both. Based on the routing configuration(s), the controller circuit 316 can transmit communications 700 to the signal source circuit 304 to request data streams $DS_1$-$DS_m$, as well as the configuration of each data stream $DS_1$-$DS_m$.

Similarly, the controller circuit 316 can transmit communications 700 over the communications interface 322 to each remote unit 306(1)-306(N) such that the remote units 306(1)-306(N) transmit and/or receive the routed data streams $DS_1$-$DS_m$ according to the routing configurations. It should be understood that the controller circuit 316 can be implemented using multiple hardware types and schemes. For example, the controller circuit 316 can be included in the signal router circuit 302 or another component of the wireless communications system 300, or as a logical and/or physical portion of a self-optimized network (SON) server.

Figure 8:
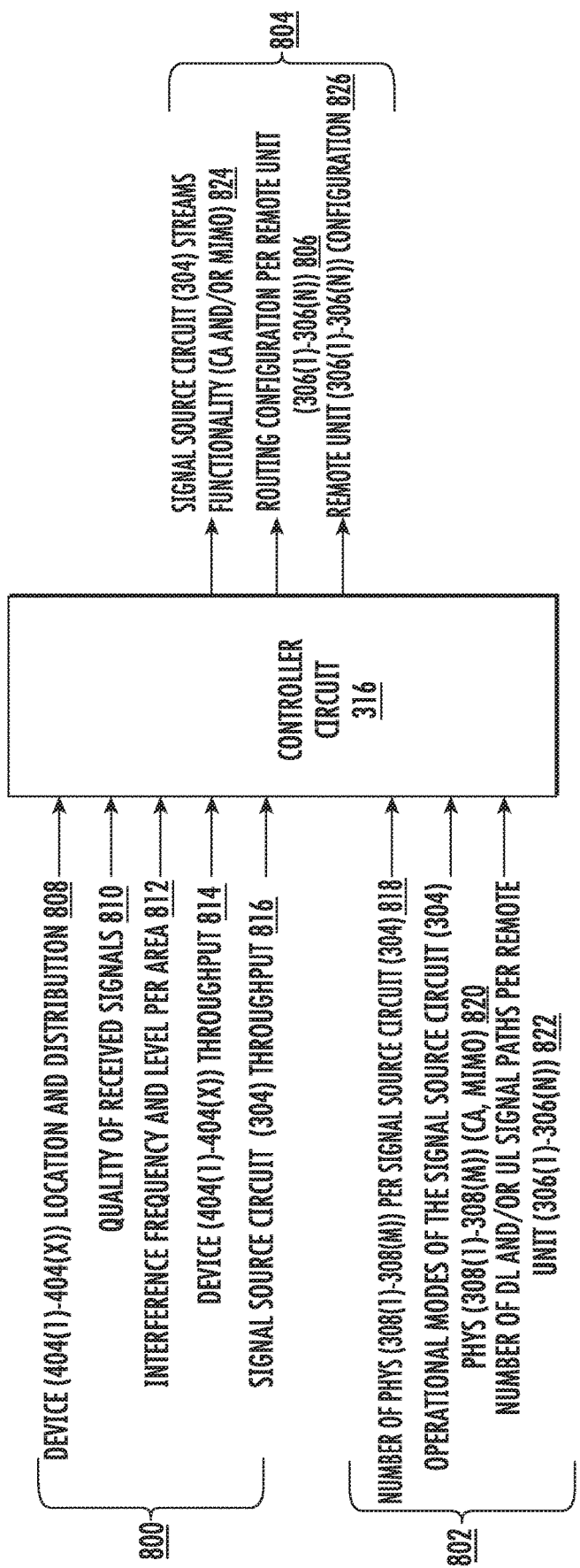
FIG. 8 is a schematic diagram of the controller circuit of FIGS. 3-7, illustrating exemplary inputs and outputs of the controller circuit.

FIG. 8 is a schematic diagram of the controller circuit 316 of FIGS. 3-7, illustrating exemplary inputs and outputs of the controller circuit 316. As depicted in FIG. 8, the controller circuit 316 receives one or more communication conditions 800 and/or capability indications 802 (e.g., through the communications interface 322 of FIG. 7). Based on the communication conditions 800 and/or capability indications 802, the controller circuit 316 transmits control outputs 804 (e.g., through the communications interface 322 and/or routing control output 326 of FIG. 7).

In this regard, the controller circuit 316 is configured to determine a routing configuration 806 for each of one or more remote units 306(1)-306(N). In determining each routing configuration 806, the controller circuit 316 determines at least one data stream $DS_1$-$DS_m$ to route from the signal source circuit 304, through the signal router circuit 302, and to the respective remote unit 306(1)-306(N). The controller circuit 316 also determines whether each data stream $DS_1$-$DS_m$ is to be routed in a MIMO configuration, in a CA configuration (e.g., as a component carrier), or both. The routing configurations 806 may be based on the one or more received communication conditions 800 and/or capability indications 802.

In an exemplary aspect, the controller circuit 316 can receive the communication conditions 800, including locations and/or distributions 808 of user mobile communications devices 404(1)-404(X) in communication with the remote units 306(1)-306(N). An indication of the locations and/or distributions 808 can be received from the remote units 306(1)-306(N). The locations and/or distributions 808 of user mobile communications devices 404(1)-404(X) can be determined by the remote units 306(1)-306(N) and/or reported by the user mobile communications devices 404(1)-404(X). In some examples, the indication of the locations and/or distributions 808 can be received through other circuitry (e.g., the signal source circuit 304), sensors, or other network devices. The communication conditions 800 received by the controller circuit 316 can also include a measurement or estimates of signal quality 810 associated with one or more remote units 306(1)-306(N). Such measurements or estimations of signal quality 810 may include SNR measurements or estimations from the remote units 306(1)-306(N) and/or the user mobile communications devices 404(1)-404(X). In some examples, the SNR measurements or estimations can be received from the signal source circuit 304 or another network device.

In addition, the communication conditions 800 can include noise or interference measurements 812, such as a frequency and level of interference in the remote coverage area 400 of each remote unit 306(1)-306(N). The noise or interference measurements 812 can be received from the remote units 306(1)-306(N), the user mobile communications devices 404(1)-404(X), and/or other sensors or devices. The communication conditions 800 may include a measurement or estimate of device throughput 814 for the user mobile communications devices 404(1)-404(X), which may be received from the remote units 306(1)-306(N) or received from the signal source circuit 304. In addition, a measurement or estimate of throughput 816 (e.g., throughput for the signal source circuit 304, the remote units 306(1)-306(N), or the user mobile communications devices 404(1)-404(X)) can be received from the signal source circuit 304 or a separate source, such as a self-organizing network (SON) server.

In another exemplary aspect, the controller circuit 316 can receive capability indications 802 on which routing configurations 806 may be based. The capability indications 802 can include a number of PHY processing circuits 308(1)-308(M) available 818 for each signal source circuit 304. The number of PHY processing circuits 308(1)-308(M) available 818 can be received from the signal source circuit(s) 304. The capability indications 802 can also include an operational mode 820 of the signal source circuit(s) 304 and/or its PHY processing circuits 308(1)-308(M). In some examples, a given PHY processing circuit 308(1)-308(M) can support CA, MIMO, or both. The controller circuit 316 can also receive a number of available downlink paths 406(1)-406(4) and/or uplink paths available 822 in each remote unit 306(1)-306(N).

In another exemplary aspect, the controller circuit 316 is configured to transmit control outputs 804, including one or more routing configurations 806. Through the routing configurations 806, the controller circuit 316 determines at least one data stream $DS_1$-$DS_m$ to route to each respective remote unit 306(1)-306(N). The controller circuit 316 also determines, through the routing configurations 806, whether each data stream $DS_1$-$DS_m$ is to be routed in a MIMO configuration, in a CA configuration (e.g., as a component carrier), or both based on the communication conditions 800 and/or capability indications 802 as described above with respect to FIGS. 4-7. Based on the routing configurations 806, the controller circuit 316 can also transmit a control output 804 to cause the signal source circuit 304 to configure data streams 824 (e.g., a number of data streams $DS_1$-$DS_m$ and whether each is configured as CA, MIMO, or both). The controller circuit 316 may also transmit a remote unit configuration 826 to each remote unit 306(1)-306(N) such that the remote units 306(1)-306(N) transmit and/or receive the routed data streams $DS_1$-$DS_m$ according to the routing configurations 806.

Figure 9:
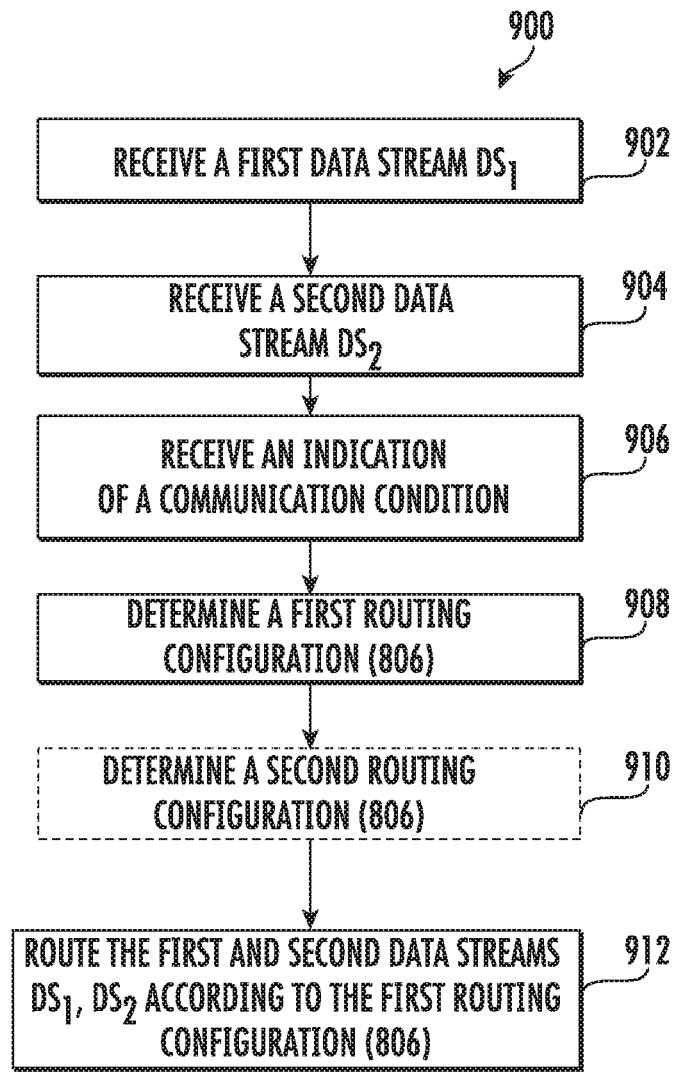
FIG. 9 is a flowchart illustrating an exemplary process of a signal router circuit in the wireless communications system in FIGS. 3-8 for selectively routing a first data stream and a second data stream from one or more signal source circuits to a plurality of remote units in the wireless communications system.

FIG. 9 is a flowchart illustrating an exemplary process 900 of the signal router circuit 302 in the wireless communications system 300 in FIGS. 3-8 for selectively routing a first data stream $DS_1$ and a second data stream $DS_2$ from the signal source circuit 304 to the remote units 306(1)-306(N) in the wireless communications system 300. As shown in the exemplary process 900 in FIG. 9 referencing the wireless communications system 300 in FIGS. 3-6, the signal router circuit 302 receives a first data stream $DS_1$ from the signal source circuit 304 to be distributed to the remote units 306(1)-306(N) (block 902). The signal router circuit 302 further receives a second data stream $DS_2$ from the signal source circuit 304 (block 904).

With continuing reference to FIG. 9, the signal router circuit 302 routes the first data stream $DS_1$ and the second data stream $DS_2$ to the one or more remote units 306(1)-306(N) according to one or more routing configurations 806 of the signal router circuit 302. The controller circuit 316 controls the signal router circuit 302 for determining the routing configurations 806 indicating how many data streams $DS_1$-$DS_m$ will be routed to each remote unit, as well as whether the data streams $DS_1$-$DS_m$ will be configured as MIMO, CA, or both. Accordingly, the controller circuit 316 receives an indication of a communication condition associated with at least one of the remote units 306(1)-306(N) (block 906). The controller circuit 316 determines a first routing configuration 806 for a first remote unit 306(1) (block 908), which may include determining to route the first data stream $DS_1$ in at least one of a first MIMO configuration or a first CA configuration based on the communication condition, and determining to route the second data stream $DS_2$ in at least one of a second MIMO configuration or a second CA configuration based on the communication condition. In some examples, the controller circuit 316 also determines a second routing configuration 806 for a second remote unit 306(2) (block 910). The signal router circuit 302 further routes the first data stream $DS_1$ and the second data stream $DS_2$ to at least the first remote unit 306(1) of the plurality of remote units 306(1)-306(N) according to the first routing configuration 806 (block 912).

Figure 10:
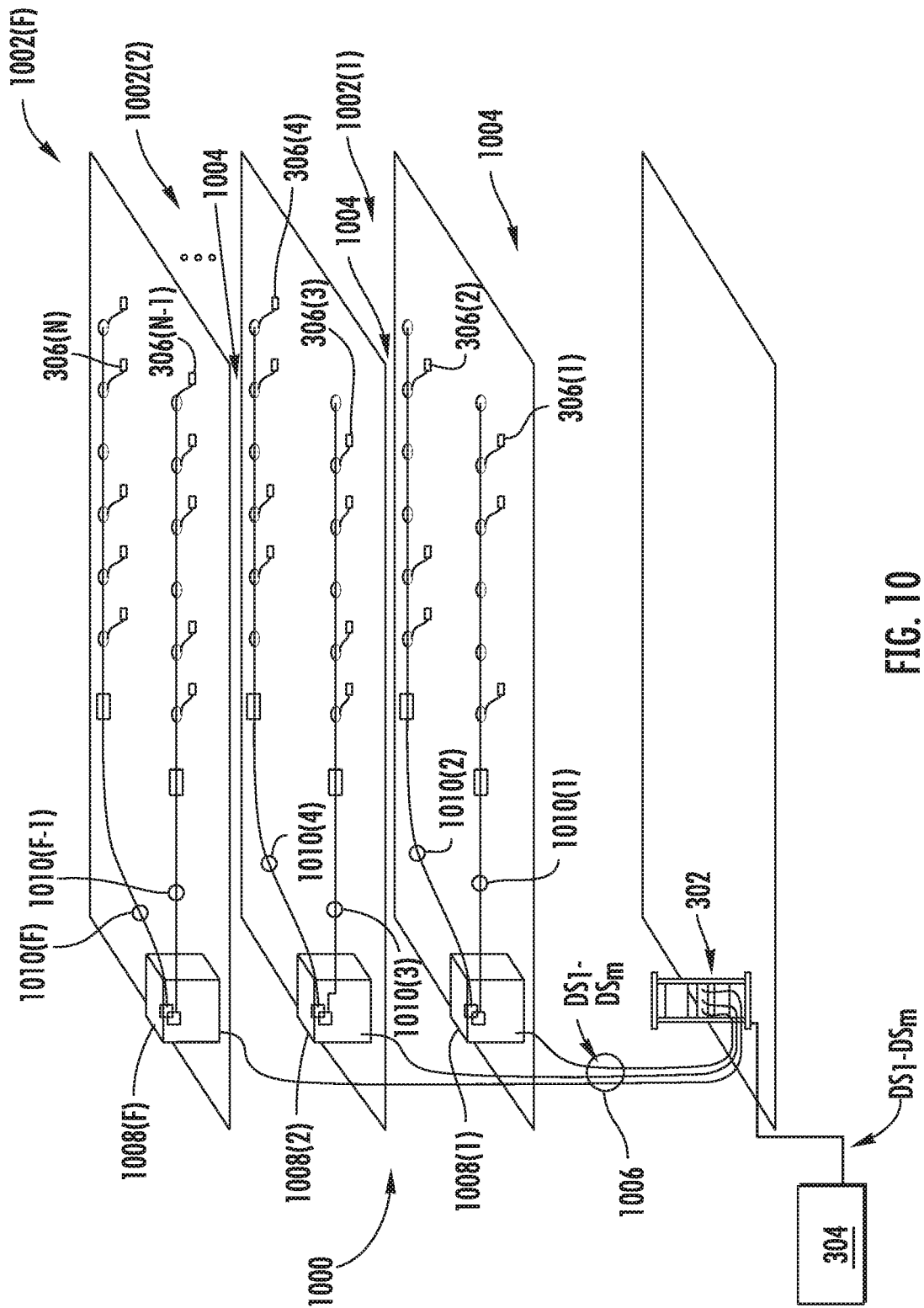
FIG. 10 is a partially schematic cut-away diagram of an exemplary building infrastructure in which the wireless communications system of FIGS. 3-8 can be provided.

FIG. 10 is a partially schematic cut-away diagram of an exemplary building infrastructure 1000 in which the wireless communications system 300 of FIGS. 3-8 can be provided. The building infrastructure 1000 in this embodiment includes a first (ground) floor 1002(1), a second floor 1002(2), and a $F^{th}$ floor 1002(F), where 'F' can represent any number of floors. The floors 1002(1)-1002(F) are serviced by a signal router circuit 302 to provide antenna coverage areas 1004 in the building infrastructure 1000. The signal router circuit 302 is communicatively coupled to a signal source circuit 304, which may include some or all functions of a base transceiver station implementing carrier aggregation functionality. For example, the signal source circuit 304 may transmit and receive packetized data or other communications from a telecommunications network. The signal source circuit 304 includes circuitry implementing one or more PHY processing circuits (e.g., PHY processing circuits 308(1)-308(M) described above with respect to FIG. 3). Each PHY processing circuit can generate digital signals representing a downlink baseband signal of a corresponding component carrier. Each PHY processing circuit may further process uplink baseband signals received from the signal router circuit 302. Accordingly, a downlink and/or uplink for a plurality of data streams $DS_1$-$DS_m$ couple the signal source circuit 304 to the signal router circuit 302.

The signal router circuit 302 is communicatively coupled to the remote units 306(1)-306(N) and routes the data streams $DS_1$-$DS_m$ to the remote units 306(1)-306(N) according to one or more routing configurations of the signal router circuit 302 as described above with respect to FIGS. 3-9. In some embodiments, the signal router circuit 302 is coupled to the signal source circuit 304 and the remote units 306(1)-306(N) through an optical communications link (e.g., through optical fiber cables).

The data streams $DS_1$-$DS_m$ are distributed between the signal router circuit 302 and the remote units 306(1)-306(N) over a riser cable 1006 in this example. The riser cable 1006 may be routed through interconnect units (ICUs) 1008(1)-1008(F) dedicated to each floor 1002(1)-1002(F) for routing the data streams $DS_1$-$DS_m$ to the remote units 306(1)-306(N). In addition, array cables 1010(1)-1010(F) may be provided and coupled between the ICUs 1008(1)-1008(F) that contain optical fibers to distribute the data streams $DS_1$-$DS_m$ to the remote units 306(1)-306(N).

Figure 11:
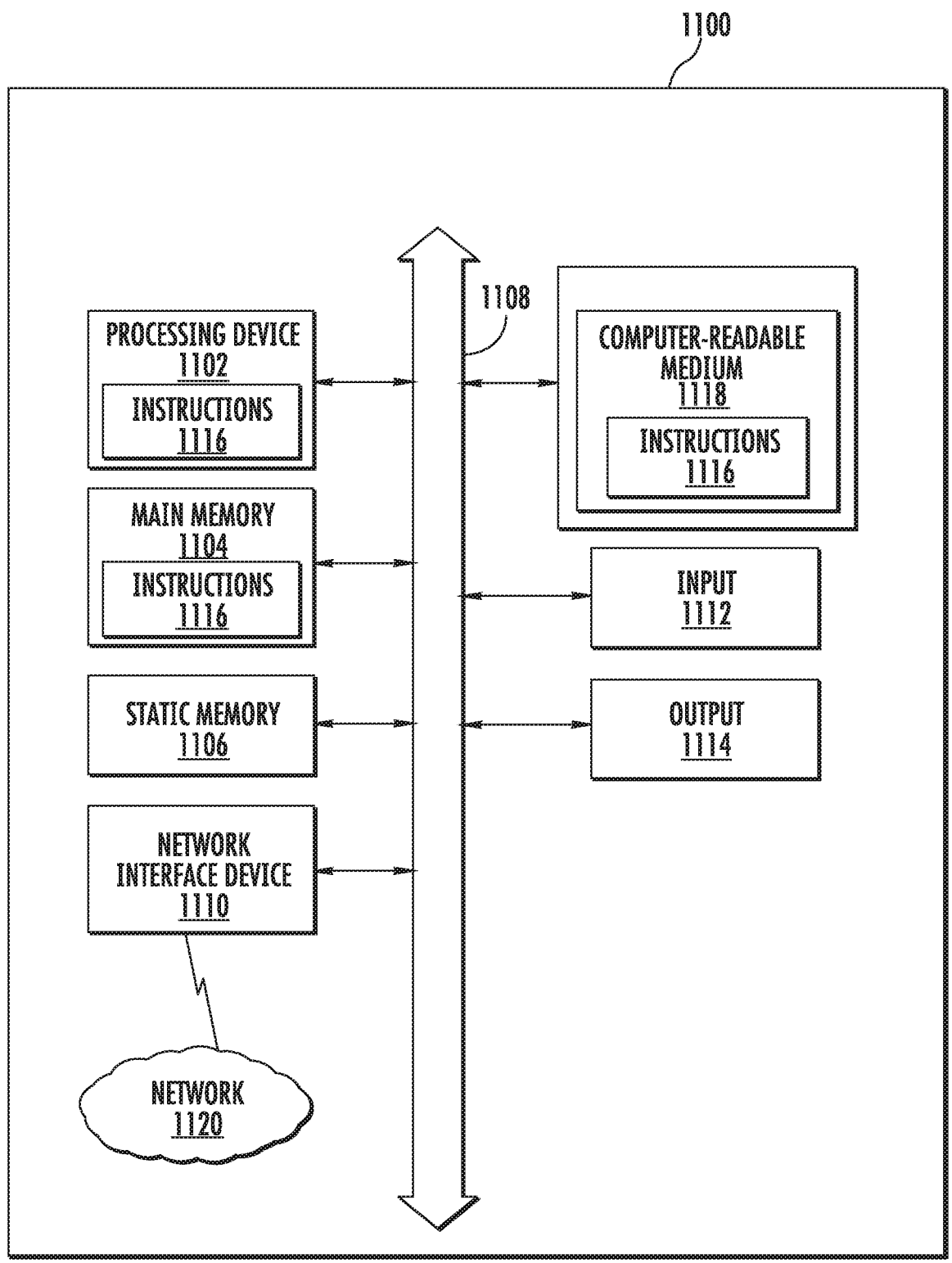
FIG. 11 is a schematic diagram illustrating a computer system that could be employed in any component in the wireless communications system in FIGS. 3-10, including but not limited to the controller circuit, for selectively routing CA and MIMO data streams.

FIG. 11 is a schematic diagram illustrating a computer system 1100 that could be employed in any component in the wireless communications system 300 in FIGS. 3-10, including but not limited to the signal router circuit 302 and/or the controller circuit 316, for selectively routing data streams $DS_1$-$DS_m$ to the remote units 306(1)-306(N) according to one or more routing configurations 806. In this regard, the computer system 1100 is adapted to execute instructions from an exemplary computer-readable medium to perform these and/or any of the functions or processing described herein.

In this regard, the computer system 1100 in FIG. 11 may include a set of instructions that may be executed to program and configure programmable digital signal processing circuits in a wireless communications system for supporting scaling of supported communications services. The computer system 1100 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1100 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1100 in this embodiment includes a processing device or processor 1102, a main memory 1104 (e.g., read-only memory (ROM), flash memory, dynamic random access memory (DRAM), such as synchronous DRAM (SDRAM), etc.), and a static memory 1106 (e.g., flash memory, static random access memory (SRAM), etc.), which may communicate with each other via a data bus 1108. Alternatively, the processor 1102 may be connected to the main memory 1104 and/or static memory 1106 directly or via some other connectivity means. The processor 1102 may be a controller circuit such as the controller circuit 316 of FIGS. 3-6, and the main memory 1104 or static memory 1106 may be any type of memory.

The processor 1102 represents one or more general-purpose processing devices, such as a microprocessor, central processing unit, or the like. More particularly, the processor 1102 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1102 is configured to execute processing logic in instructions for performing the operations and steps discussed herein.

The computer system 1100 may further include a network interface device 1110. The computer system 1100 also may or may not include an input 1112, configured to receive input and selections to be communicated to the computer system 1100 when executing instructions. The computer system 1100 also may or may not include an output 1114, including but not limited to a display, a video display unit (e.g., a liquid crystal display (LCD) or a cathode ray tube (CRT)), an alphanumeric input device (e.g., a keyboard), and/or a cursor control device (e.g., a mouse). Exemplary inputs 1112 can include communication conditions 800 and/or capability indications 802, and exemplary outputs 1114 can include control outputs 804 as described further above with respect to FIG. 8.

The computer system 1100 may or may not include a data storage device that includes instructions 1116 stored in a computer-readable medium 1118. The instructions 1116 may also reside, completely or at least partially, within the main memory 1104 and/or within the processor 1102 during execution thereof by the computer system 1100, the main memory 1104, and the processor 1102 also constituting computer-readable medium. The instructions 1116 may further be transmitted or received over a network 1120 via the network interface device 1110.

While the computer-readable medium 1118 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

It will be apparent to those skilled in the art that various modifications and variations can be made without departing from the spirit or scope of the invention.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the wireless communications systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller circuit may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

What is claimed is:

1. A wireless communications system, comprising:
    a plurality of remote units, each remote unit including an electrical-to-optical (E-O) converter, wherein the plurality of remote units is distributed over multiple floors of an infrastructure;
    a plurality of optical fiber cables connected to one or more of the plurality of remote units;
    a signal router circuit configured to route multiple-input multiple-output (MIMO) communications signals and carrier aggregation (CA) communications signals, comprising:
        a first signal source input configured to receive a first data stream;
        a second signal source input configured to receive a second data stream;
        a plurality of signal outputs each coupled to a remote unit among the plurality of remote units via one or more of the plurality of optical fiber cables; and
        a routing control input configured to receive a routing control signal; and
    a controller circuit comprising a routing control output coupled to the routing control input, the controller circuit configured to:
        determine a first routing configuration for a first signal output of the plurality of signal outputs, comprising:
            determining to route the first data stream in at least one of a first MIMO configuration or a first CA configuration; and
            determining to route the second data stream in at least one of a second MIMO configuration or a second CA configuration; and
        communicate the routing control signal indicating the first routing configuration for routing the first data stream and the second data stream to the first signal output.

2. The wireless communications system of claim 1, wherein the controller circuit is further configured to:
    receive an indication of a communication condition associated with at least one of the plurality of signal outputs;
    determine to route the first data stream in at least one of the first MIMO configuration or the first CA configuration based on the communication condition; and
    determine to route the second data stream in at least one of the second MIMO configuration or the second CA configuration based on the communication condition.

3. The wireless communications system of claim 2, wherein:
    the communication condition comprises a signal-to-noise ratio (SNR) associated with the first signal output; and
    when the SNR associated with the first signal output exceeds a threshold, the controller circuit is configured to:
        determine to route the first data stream in at least the first MIMO configuration; and
        determine to route the second data stream in at least the second MIMO configuration interleaved with the first data stream.

4. The wireless communications system of claim 2, wherein:
    the communication condition comprises a signal-to-noise ratio (SNR) associated with the first signal output;
    when the SNR associated with the first signal output does not exceed a threshold, the controller circuit is configured to:
        determine to route the first data stream in the first CA configuration; and
        determine to route the second data stream in the second CA configuration interleaved with the first data stream.

5. The wireless communications system of claim 1, wherein the controller circuit is further configured to:
    receive an indication of a communication condition associated with at least one of the plurality of signal outputs;
    determine a second routing configuration for a second signal output of the plurality of signal outputs based on the communication condition; and
    communicate the routing control signal indicating the first routing configuration and the second routing configuration.

6. The wireless communications system of claim 5, wherein the communication condition comprises a distribution of user mobile communications devices in communication with at least one of a first remote unit coupled to the first signal output or a second remote unit coupled to the second signal output.

7. The wireless communications system of claim 6, wherein when the distribution of the user mobile communications devices indicates a majority of the user mobile communications devices are located within an overlapping coverage area of the first remote unit and the second remote unit:
    the signal router circuit further comprises:
        a third signal source input configured to receive a third data stream; and
        a fourth signal source input configured to receive a fourth data stream; and
    the controller circuit is further configured to:
        determine the first routing configuration, comprising:
            determining to route the first data stream in the first MIMO configuration and the first CA configuration; and
            determining to route the second data stream in the second MIMO configuration and the second CA configuration;
        determine the second routing configuration, comprising:
            determining to route the third data stream in a third MIMO configuration interleaved with the first data stream and in a third CA configuration; and determining to route the fourth data stream in a fourth MIMO configuration interleaved with the second data stream and in a fourth CA configuration; and communicate the routing control signal indicating the first routing configuration for routing the first data stream and the second data stream to the first signal output and indicating the second routing configuration for routing the third data stream and the fourth data stream to the second signal output.

8. The wireless communications system of claim 6, wherein when the distribution of the user mobile communications devices indicates a majority of the user mobile communications devices are located within a threshold distance of the first remote unit or the second remote unit, the controller circuit is further configured to:

determine the first routing configuration, comprising:
determining to route the first data stream in the first MIMO configuration; and
determining to route the second data stream in the second MIMO configuration interleaved with the first data stream; and determine the second routing configuration, comprising routing the first data stream and the second data stream to the second signal output.

9. The wireless communications system of claim 5, wherein the controller circuit is further configured to determine the first routing configuration based on a predicted throughput associated with the plurality of signal outputs, and wherein the predicted throughput is based on a signal-to-noise ratio (SNR) measurement associated with at least one of the plurality of signal outputs.

10. The wireless communications system of claim 5, wherein the controller circuit is further configured to determine the first routing configuration based on a measured throughput associated with the plurality of signal outputs.

11. The wireless communications system of claim 5, wherein the controller circuit is further configured to determine the first routing configuration based on a measurement of interference associated with the plurality of signal outputs.

12. The wireless communications system of claim 1, wherein the controller circuit comprises a communications interface configured to:

couple to at least one of the plurality of remote units or a signal source circuit coupled to the first signal source input;

receive an indication of a communication condition from a first remote unit of the plurality of remote units through the communications interface, the communication condition comprising at least one of a MIMO capability, a CA capability, a signal-to-noise ratio (SNR) measurement, or a distribution of user mobile communications devices in communication with the first remote unit;

determine the first routing configuration based on the indication of the communication condition; and communicate an indication of the first routing configuration to the first remote unit.

13. The wireless communications system of claim 12, wherein the controller circuit is further configured to:

receive a capability indication from the signal source circuit coupled to the first signal source input, comprising at least one of a number of data streams available or a CA or MIMO mode capability; and determine the first routing configuration based on the capability indication;

communicate a request to the signal source circuit to configure the first data stream and the second data stream in accordance with the first routing configuration through the communications interface.

14. The wireless communications system of claim 12, wherein the controller circuit is further configured to:

receive an indication of a communication condition from the signal source circuit coupled to the first signal source input, the communication condition comprising at least one of a signal-to-noise ratio (SNR) measurement or a distribution of user mobile communications devices; and determine the first routing configuration based on the communication condition.

15. The wireless communications system of claim 1, wherein:

each remote unit is coupled to a corresponding signal output of the plurality of signal outputs;

the first signal source input is configured to receive the first data stream in baseband; and in response to receiving the first routing configuration from the controller circuit, the signal router circuit is configured to route the first data stream in baseband to a first remote unit of the plurality of remote units over the first signal output.

16. The wireless communications system of claim 1, further comprising a signal source circuit coupled to the first signal source input and the second signal source input;

wherein the signal source circuit is configured to:
transmit the first data stream in baseband to the first signal source input in at least one of the first MIMO configuration or the first CA configuration according to the first routing configuration; and transmit the second data stream in baseband to the second signal source input in at least one of the second MIMO configuration or the second CA configuration according to the first routing configuration.

17. The wireless communications system of claim 1, each remote unit is coupled to a corresponding signal output of the plurality of signal outputs by an optical fiber communications link;

wherein:
the first signal output comprises an electrical-to-optical (E-O) converter configured to transmit a first optical communications signal by the respective optical fiber communications link for the first data stream and the second data stream; and the O-E converter of a first remote unit of the plurality of remote units is configured to convert the first optical communications signal into a first electrical communications signal to interface with a radio frequency (RF) transmitter/receiver.

18. The wireless communications system of claim 17, wherein the first data stream comprises:

an uplink configured to transmit data from a mobile device to a telecommunications network; and a downlink configured to transmit data from the telecommunications network to the mobile device.

19. The wireless communications system of claim 18, wherein the second data stream comprises a downlink configured to transmit data from the telecommunications network to the mobile device.

20. The wireless communications system of claim 19, wherein the second data stream further comprises an uplink configured to transmit data from the mobile device to the telecommunications network.

21. The wireless communications system of claim 17, wherein the controller circuit is further configured to determine the first routing configuration based on a predicted throughput associated with the plurality of signal outputs, and wherein the predicted throughput is based on a signal-to-noise ratio (SNR) measurement associated with at least one of the plurality of signal outputs.

22. The wireless communications system of claim 17, wherein the controller circuit is further configured to determine the first routing configuration based on a measured throughput associated with the plurality of signal outputs.

23. The wireless communications system of claim 17, wherein the controller circuit is further configured to determine the first routing configuration based on a measurement of interference associated with the plurality of signal outputs.

\* \* \* \* \*